(12) United States Patent
Yamakawa et al.

(10) Patent No.: US 7,893,303 B2
(45) Date of Patent: Feb. 22, 2011

(54) POLYARYLENE, PROCESS FOR PRODUCING THE SAME, SOLID POLYELECTROLYTE, AND PROTON-CONDUCTIVE FILM

(75) Inventors: Yoshitaka Yamakawa, Ibaraki (JP); Makoto Higami, Ibaraki (JP)

(73) Assignee: JSR Corporation, Tokyo (JP)

( * ) Notice: Subject to any disclaimer, the term of this patent is extended or adjusted under 35 U.S.C. 154(b) by 99 days.

(21) Appl. No.: 11/815,370

(22) PCT Filed: Feb. 4, 2005

(86) PCT No.: PCT/JP2005/001714
§ 371 (c)(1), (2), (4) Date: Sep. 21, 2007

(87) PCT Pub. No.: WO2006/082653
PCT Pub. Date: Aug. 10, 2006

(65) Prior Publication Data
US 2008/0015389 A1   Jan. 17, 2008

(51) Int. Cl.
C07C 315/00 (2006.01)
(52) U.S. Cl. ........................................ 568/31
(58) Field of Classification Search .................. 568/31
See application file for complete search history.

(56) References Cited

U.S. PATENT DOCUMENTS

| | | | | |
|---|---|---|---|---|
| 4,371,475 | A * | 2/1983 | Yanagisawa et al. | 562/42 |
| 5,403,675 | A | 4/1995 | Ogata et al. | |
| 5,637,652 | A | 6/1997 | Kato et al. | |
| 6,555,626 | B2 * | 4/2003 | Goto et al. | 525/242 |
| 6,660,183 | B2 | 12/2003 | Sato et al. | |
| 6,812,290 | B2 * | 11/2004 | Goto et al. | 525/242 |
| 6,986,960 | B2 | 1/2006 | Oguri et al. | |
| 6,989,212 | B2 * | 1/2006 | Morishima et al. | 429/33 |
| 7,022,743 | B2 | 4/2006 | Morishima et al. | |
| 7,163,988 | B2 * | 1/2007 | Rozhanskii et al. | 525/535 |
| 7,279,244 | B2 | 10/2007 | Morishima et al. | |
| 2003/0118886 | A1 | 6/2003 | Morishima et al. | |
| 2003/0129467 | A1 | 7/2003 | Morishima et al. | |

FOREIGN PATENT DOCUMENTS

| | | |
|---|---|---|
| EP | 1 400 548 | 3/2004 |
| EP | 1 431 281 | 6/2004 |
| JP | 2-00159 | 1/1990 |
| JP | 7-48437 | 2/1995 |
| JP | 2002-289222 | 10/2002 |
| JP | 2002-371055 | 12/2002 |
| JP | 3003-187826 * | 4/2003 |
| JP | 2003-155347 | 5/2003 |
| JP | 2003-187826 | 7/2003 |
| JP | 2004-87288 | 3/2004 |
| JP | 2000095970 * | 4/2004 |
| JP | 2005-60585 | 3/2005 |
| JP | 2005-60625 | 3/2005 |
| JP | 2005-82757 | 3/2005 |

OTHER PUBLICATIONS

Polymer electrolyte membranes from novel sulfonated polyimides for direct methanol fuel cell, Transactions of the Materials Research Society of Japan (2004), 29(3), 1035-1038.*
"Polymer Peprints", Japan, vol. 42, No. 3, 1993, p. 703.
"Polymer Peprints", Japan, vol. 42, No. 7, 1993, pp. 2490-2492.
"Polymer Peprints", Japan, vol. 43, No. 3, 1994, pp. 735-736.

* cited by examiner

*Primary Examiner*—Daniel M Sullivan
*Assistant Examiner*—Chukwuma O Nwaonicha
(74) *Attorney, Agent, or Firm*—Oblon, Spivak, McClelland, Maier & Neustadt, L.L.P.

(57) ABSTRACT

A polyarylene having a structural unit shown by the following formula (1) is disclosed.

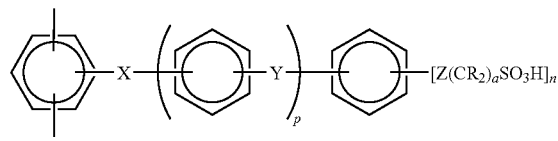

(1)

wherein X and Y indicate a divalent organic group or a single bond, Z shows an oxygen atom or a sulfur atom, R represents at least one atom or group selected from the group consisting of a hydrogen atom, a fluorine atom, an alkyl group, and a fluorine-substituted alkyl group, a is an integer of 1 to 20, n is an integer of 1 to 5, and p is an integer of 0 to 10.

10 Claims, 5 Drawing Sheets

POLYARYLENE, PROCESS FOR PRODUCING THE SAME, SOLID POLYELECTROLYTE, AND PROTON-CONDUCTIVE FILM

TECHNICAL FIELD

The present invention relates to a polyarylene having a sulfonic acid group or sulfonic acid groups, a process for producing the same, a solid polyelectrolyte, and a proton-conductive film.

BACKGROUND ART

An electrolyte is used in (aqueous) solutions in many cases. It is, however, a recent tendency to replace a solution electrolyte with a solid electrolyte. A first reason for this tendency is ease of processing when an electrolyte is used for electric and electronic materials, for example, and a second reason is shifting to small and light materials and laborsaving. Proton conductive materials include inorganic materials and organic materials. As an example of inorganic electrolytes, a hydrate compound such as uranyl phosphate can be given. An inorganic compound, however, does not provide a sufficient interface and has many problems when a conduction layer is formed on a substrate or an electrode.

On the other hand, as examples of organic compounds, polymers belonging to a cation exchange resin, such as a sulfonated product of a vinyl polymer such as polystyrene sulfonic acid, a perfluoroalkyl sulfonic acid polymer represented by Nafion™ (manufactured by E.I. du Pont de Nemours and Company), a perfluoroalkyl carboxylic acid polymer, and a polymer produced by introducing a sulfonic acid group and a phosphoric acid group into a heat resistant polymer such as polybenzimidazole and polyether ether ketone (see, for example, Polymer Preprints, Japan, 2490-2942, Vol. 42, No. 7 (1993), Polymer Preprints, Japan, 735-736, Vol. 43, No. 3 (1994), and Polymer Preprints, Japan, 730, Vol. 42, No. 3 (1993)) can be given.

These organic polymers are usually used in the form of a film. Due to their capability of being soluble in a solvent and their thermoplastic properties, organic polymers can be processed by joining with a conductive film on an electrode. However, due to insufficient proton conductivity and poor durability, many of these organic polymers have problems such as a decrease in the proton conductivity at a high temperature (100° C. or more), a significant decrease in the mechanical properties (particularly, modulus of elasticity), large dependability under humid conditions, not necessarily sufficient adhesion with an electrode, and a decrease in the strength and deformation due to excessive swelling during use which is caused by the hydrated polymer structure. Therefore, these organic polymers have various problems in applying to the electric and electronic materials and the like.

U.S. Pat. No. 5,403,675 proposes a solid polyelectrolyte made from sulfonated rigid polyphenylene. The solid polyelectrolyte comprises a polymer obtained by polymerizing an aromatic compound having a phenylene chain (the structure described in column 9 of U.S. Pat. No. 5,403,675) as a main component, into which a sulfonic acid group is introduced by reacting with a sulfonation agent. Although the proton conductivity is improved by increasing the amount of sulfonic acid groups introduced, the mechanical properties of the resulting sulfonated polymer, for example, breaking elongation, toughnesses such as bending resistance, and hot water resistance are remarkably impaired.

DISCLOSURE OF THE INVENTION

The invention solves these problems by providing a polyarylene-based copolymer exhibiting high proton conductivity in a wide temperature and humidity range due to possession of an aliphatic sulfonic acid group and being capable of producing a proton-conductive film with excellent hot water resistance and chemical stability, a process for producing the same, and a proton-conductive film made from the copolymer.

The polyarylene of the invention comprises a structural unit shown by the following formula (1):

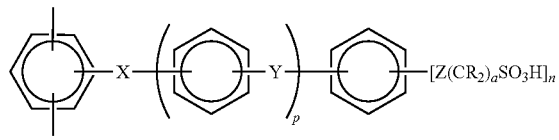

(1)

wherein X and Y indicate a divalent organic group or a single bond, Z shows an oxygen atom or a sulfur atom, R represents at least one atom or group selected from the group consisting of a hydrogen atom, a fluorine atom, an alkyl group, and a fluorine-substituted alkyl group, a is an integer of 1 to 20, n is an integer of 1 to 5, and p is an integer of 1 to 10.

The polyarylene may comprise 0.5 to 100 mol % of the structural unit shown by the above formula (1) and 0 to 99.5 mol % of a structural unit shown by the following formula (2):

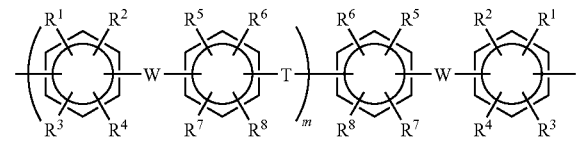

(2)

wherein $R^1$ to $R^8$ may be the same or different and indicate at least one atom or group selected from the group consisting of a hydrogen atom, a fluorine atom, an alkyl group, a fluorine-substituted alkyl group, an allyl group, and an aryl group, W shows a divalent electron-drawing group, T indicates a divalent organic group, and m is 0 or a positive integer.

The process for producing the polyarylene of the invention comprises reacting of a Compound (A) containing a structural unit shown by the following formula (3) with a Compound (B) shown by the following formula (4) or a Compound (C) shown by the following formula (5).

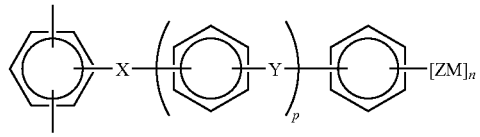

(3)

wherein X, Y, Z, n, and p are the same as defined in formula (1) and M represents a hydrogen atom or an alkali metal atom.

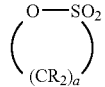

(4)

wherein R and a are the same as defined in formula (1).

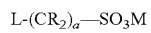

(5)

wherein R and a are the same as defined in the formula (1), M is the same as defined in formula (3), and L represents a chlorine atom, a bromine atom, or an iodine atom.

In the above process for producing the polyarylene, Compound (A) may further comprise a structural unit shown by the above formula (2).

The solid polyelectrolyte of the invention comprises the above-described polyarylene. The proton-conductive film of the invention comprises the above-described polyarylene.

A polyarylene-based copolymer exhibiting high proton conductivity in a wide temperature and humidity range due to possession of an aliphatic sulfonic acid group and being capable of producing a proton-conductive film with excellent hot water resistance and chemical stability, a process for producing the copolymer, and a proton-conductive film made from the copolymer can be provided according to the invention.

Moreover, a sulfonic acid group or sulfonic acid groups can be introduced without using a large amount of a sulfonating agent according to the invention. Only a small process load is required for recovering the polyarylene of the invention. In addition, the position(s) where the sulfonic acid group(s) are introduced and the amount of the sulfonic acid group(s) introduced can be easily controlled according to the invention. Therefore, in the polyarylene of the invention, the proton conductivity is well-adjusted as a solid electrolyte or a conductive film.

The solid polyelectrolyte of the invention therefore can be used as a solid polyelectrolyte for fuel cells, for example. Furthermore, the proton-conductive film of the invention can be used as an electrolyte for primary batteries, an electrolyte for secondary batteries, a solid polyelectrolyte for fuel cells, display elements, various sensors, signal transfer media, solid capacitors, and conductive films of an ion exchange membranes and the like. Its industrial significance is extremely important.

BEST MODE FOR CARRYING OUT THE INVENTION

Figure 1:
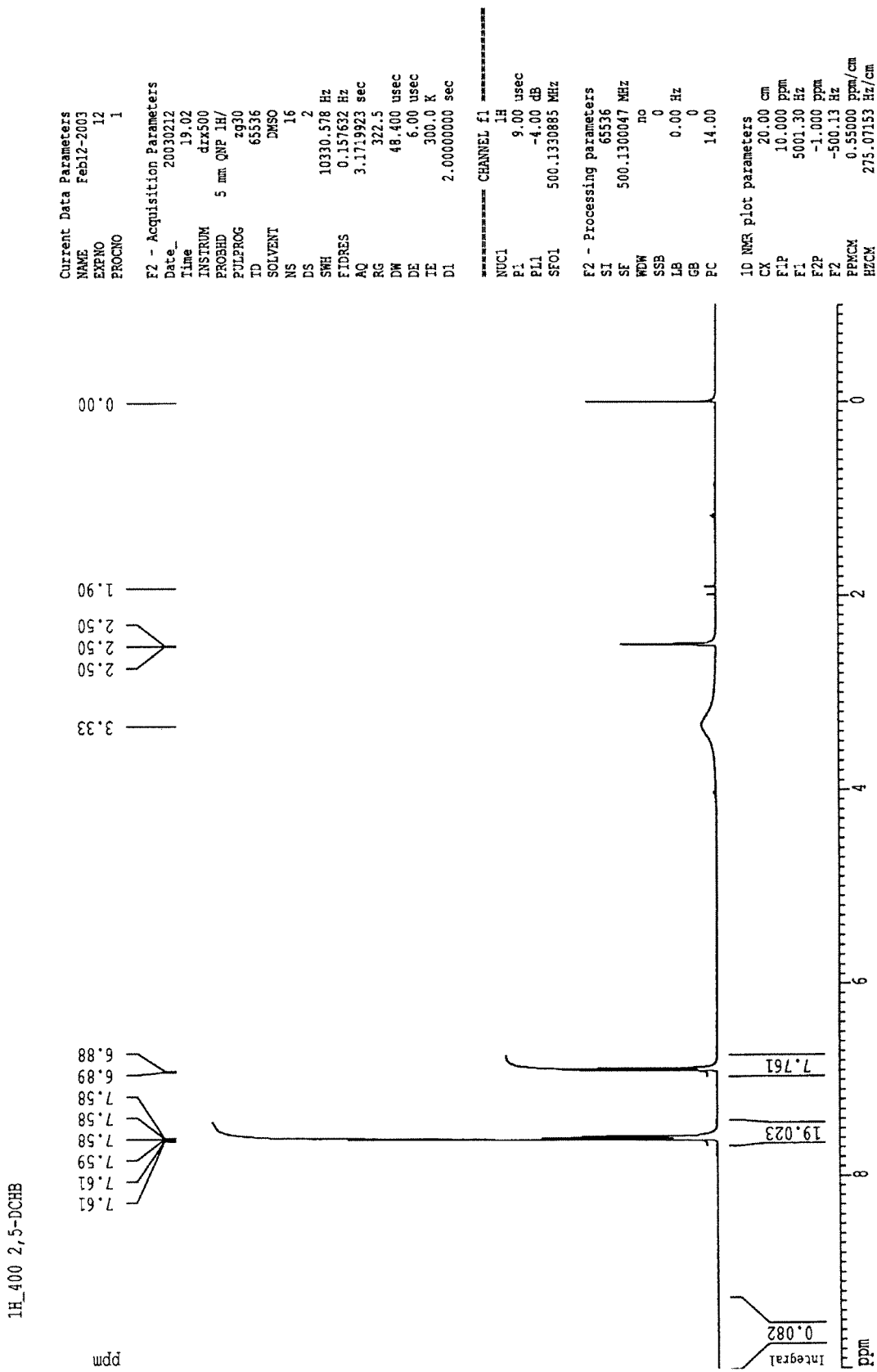
FIG. 1 is a $^1$H-NMR spectrum of a Compound ($A_1'$-1) obtained in Example 1.

The polyarylene, the process for producing the same, the solid polyelectrolyte, and the proton-conductive film will now be described in detail.

1. Polyarylene

The polyarylene of the invention comprises a structural unit shown by the following formula (1).

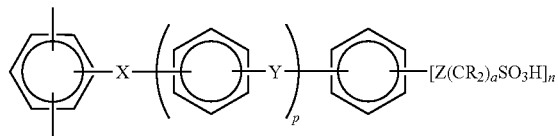

(1)

wherein X and Y indicate divalent organic groups or single bonds, for example, electron-drawing groups such as —CO—, —CONH—, —(CF$_2$)$_q$— (wherein q is an integer of 1 to 10), —C(CF$_3$)$_2$—, —COO—, —SO—, and —SO$_2$—, and electron-donating groups such as —O—, —S—, —CH=CH—, —C≡C—, and groups shown by the following formulas.

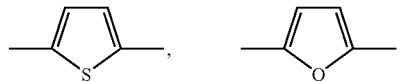

As X, an electron-drawing group, particularly —CO— or —SO$_2$—, is preferable from the viewpoint of high polymerization activity during production of the polyarylene of the invention. On the other hand, Y may or may not be an electron-drawing group.

The electron-drawing group refers to a group having a Hammett-substituent constant of 0.06 or more in the case of the meta position of a phenyl group and 0.01 or more in the case of the para position of a phenyl group.

Z represents an oxygen atom or a nitrogen atom.

R indicates at least one atom or group selected from the group consisting of a hydrogen atom, a fluorine atom, an alkyl group, and a fluorine-substituted alkyl group. As examples of the alkyl group, a methyl group, an ethyl group, a propyl group, a butyl group, an amyl group, and a hexyl group can be given. A methyl group and an ethyl group are preferable. As examples of the fluorine-substituted alkyl group, a trifluoromethyl group, a perfluoroethyl group, a perfluoropropyl group, a perfluorobutyl group, a perfluoropentyl group, and a perfluorohexyl group can be given. A trifluoromethyl group, pentafluoroethyl group, and the like are preferable.

a is an integer of 1 to 20, n is an integer of 1 to 5, and p is an integer of 0 to 10.

The polyarylene may comprise 0.5 to 100 mol % of the structural unit shown by the above formula (1) and 0 to 99.5 mol % of a structural unit shown by the following formula (2).

(2)

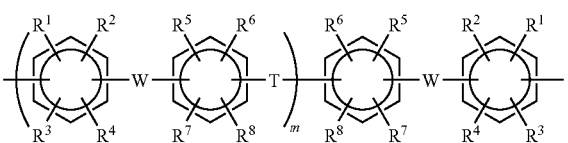

In the above formula (2), R$^1$ to R$^8$ may be the same or different and indicate at least one atom or group selected from the group consisting of a hydrogen atom, a fluorine atom, an alkyl group, a fluorine-substituted alkyl group, an allyl group, and an aryl group. As the alkyl group and fluorine-substituted alkyl group, the groups given as examples of the alkyl group and fluorine-substituted alkyl group used as R in the formula (1) can be given. As examples of the allyl group, a propenyl group and the like can be given. As the aryl group, a phenyl group, a pentafluorophenyl group, and the like can be given.

W indicates an electron-drawing group such as —CO—, —CONH—, —(CF$_2$)$_q$— (wherein q is an integer of 1 to 10), —C(CF$_3$)$_2$—, —COO—, —SO—, and —SO$_2$—.

T is a divalent organic group and may be either an electron-drawing group or an electron-donating group. As examples of the electron-drawing group, the electron-drawing groups given as examples for W may be used. As examples of the electron-donating group, —O—, —S—, —CH═CH—, —C≡C—, and groups shown by the following formulas can be given.

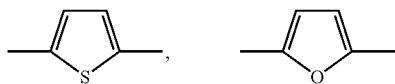

m is 0 or a positive integer, usually 100 or less, and preferably 80 or less.

The molecular weight of the polyarylene of the invention is from 10,000 to 1,000,000, and preferably from 20,000 to 800,000, in terms of the polystyrene-reduced weight average molecular weight determined by gel permeation chromatography (GPC), and from 5,000 to 200,000, and preferably from 10,000 to 160,000, in terms of the polystyrene-reduced number average molecular weight determined by GPC. If less than 10,000, film coatability is insufficient (for example, cracks are produced in formed films) and there is a problem with the strength properties. If more than 1,000,000, on the other hand, solubility is insufficient and the solution has a high viscosity, giving rise to difficulty in processing.

The amount of sulfonic acid groups in the polyarylene of the invention is 0.5 to 3 meq/g, and preferably 0.8 to 2.8 meq/g. If the amount of sulfonic acid groups is less than 0.5 meq/g, the proton conductivity may not increase. If more than 3 meq/g, on the other hand, hydrophilicity increases, resulting in a water-soluble polymer or a polymer soluble in hot water (if not water-soluble), or a polymer with reduced durability (if not water-soluble).

The structure of the polyarylene of the invention can be confirmed by, for example, S═O absorption at 1,030 to 1,045 cm$^{-1}$ and 1,160 to 1,190 cm$^{-1}$, C—O—C absorption at 1,130 to 1,250 cm$^{-1}$, and C═O absorption at 1,640 to 1,660 cm$^{-1}$ in an infrared absorption spectrum. The ratio of these groups can be identified by acidimetry of sulfonic acid, elemental analysis, and the like. In addition, the structure can be identified from the peak of the aromatic proton at 6.8 to 8.0 ppm in a nuclear magnetic resonance spectrum ($^1$H-NMR).

2. Process for Producing Polyarylene

The polyarylene of the invention is produced by reacting Compound (A) with Compound (B) or Compound (C). Compound (A), Compound (B), and Compound (C) used for producing the polyarylene of the invention will be described.

2.1. Compound (A)

Compound (A) has a structural unit shown by the following formula (3),

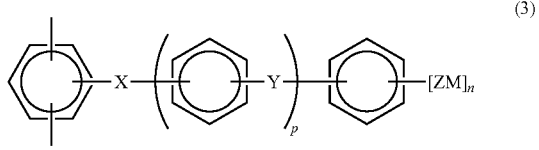

wherein X, Y, Z, n, and p are the same as defined in formula (1) and M represents a hydrogen atom or an alkali metal atom.

As examples of the alkali metal atom represented by M, sodium, potassium, and lithium can be given.

Compound (A) may further comprise a structural unit shown by the above formula (2). Specifically, Compound (A) can be obtained by polymerizing at least one Compound ($A_1$) shown by the following formula (6) as a monomer or by copolymerizing at least one Compound ($A_1$) shown by the following formula (6) and another aromatic compound (preferably at least one Compound ($A_2$) shown by the following formula (7)). More specifically, when $R^9$ in Compound ($A_1$) (see the following formula (6)) is a hydrocarbon group as shown in formula (10) mentioned later, Compound (A) can be obtained by polymerizing Compound ($A_1$) (or Compound ($A_1$) and Compound ($A_2$) or other aromatic compounds) to obtain a Compound (A'), and removing the hydrocarbon group shown by $R^9$.

Compound ($A_1$)

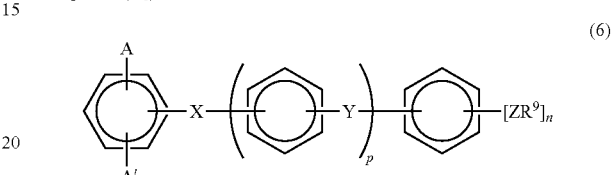

Compound ($A_2$)

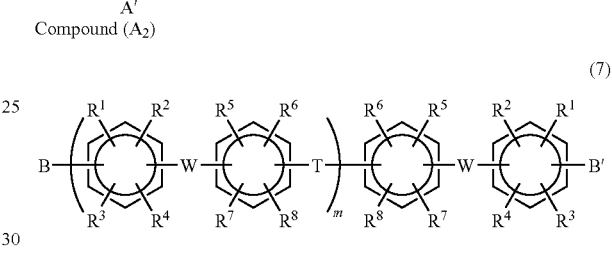

wherein X, Y, Z, n, and p are the same as defined in formula (1), and A and A', which may be either the same or different, represent a halogen atom other than a fluorine atom (chlorine, bromine, or iodine) or —OSO$_2$Q, wherein Q is an alkyl group, a fluorine-substituted alkyl group, or an aryl group.

As examples of the alkyl group represented by Q, a methyl group and an ethyl group can be given; as an example of the fluorine-substituted alkyl group, a trifluoromethyl group can be given; and as examples of the aryl group, a phenyl group and a p-tolyl group can be given.

$R^9$ represents a hydrogen atom or a hydrocarbon group having 1 to 20 carbon atoms. As specific examples of the hydrocarbon group, a linear hydrocarbon group, a branched hydrocarbon group, an alicyclic hydrocarbon group, or a hydrocarbon group having a 5-member heterocyclic ring, such as a methyl group, an ethyl group, a n-propyl group, an iso-propyl group, a tert-butyl group, an iso-butyl group, a n-butyl group, a sec-butyl group, a neopentyl group, a cyclopentyl group, a hexyl group, a cyclohexyl group, a cyclopentylmethyl group, a cyclohexylmethyl group, an adamantyl group, an adamantylmethyl group, a 2-ethylhexyl group, a bicyclo[2.2.1]heptyl group, a bicyclo[2.2.1]heptylmethyl group, a tetrahydrofurfuryl group, a 2-methylbutyl group, and a 3,3-dimethyl-2,4-dioxolanemethyl group can be given. The hydrocarbon group may contain an oxygen atom, a nitrogen atom, or a sulfur atom. As examples of the hydrocarbon group containing an oxygen atom, a tetrahydro-2-pyranyl group, a methoxymethyl group, an ethoxyethyl group, and a propoxymethyl group can be given. Of these alkyl groups, a tetrahydro-2-pyranyl group and a methoxymethyl group are preferable.

In the above formula (7), $R^1$ to $R^8$, W, T, and m are the same as defined in formula (2), and B and B', which may be either the same or different, represent a halogen atom other than a fluorine atom or —OSO$_2$Q, wherein Q is an alkyl group, a fluorine-substituted alkyl group, or an aryl group. The groups given in the above formula (6) are mentioned as the group represented by Q.

Next, Compound ($A_1$) and Compound ($A_2$) will be explained.

2.1.1. Compound ($A_1$)

Compound ($A_1$) can be synthesized by the following process, for example. In the following description, an aromatic acid halogenated compound is used as a starting material (Compound (I)), Compound ($A_1'$) obtained by reacting the aromatic acid halogenated compound with anisole, contains a hydroxyl group, and a tetrahydro-2-pyranyl group is used as a protective group of the hydroxyl group. However, Compound ($A_1'$), the reactant, and the protective group are not necessarily limited to these. For example, other reactants (such as 1,4-dimethoxybenzene, 1,3-dimethoxybenzene, 1,2-dimethoxybenzene, 1,2,3-trimethoxybenzene, and methylthiobenzene) may be used instead of anisole and reacted with the aromatic acid halogenated compound.

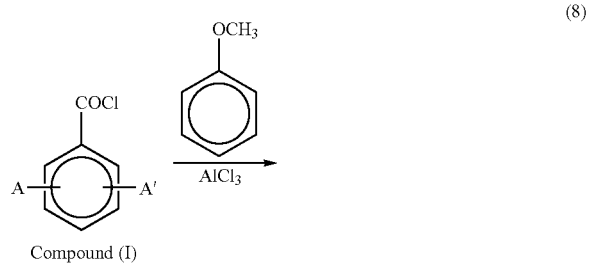

(8)

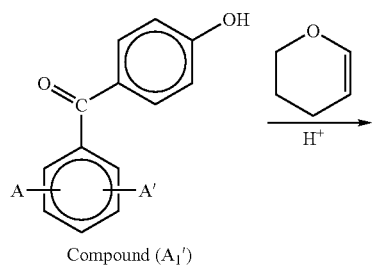

(i) Friedel-Crafts Acylation

For example, after adding aluminum chloride to a dichloromethane solution of anisole in an ice water bath (−10° C.), Compound (I) is added dropwide and the mixture is stirred at room temperature for 1 to 12 hours. The reaction solution is added to ice-cooled water containing concentrated hydrochloric acid and the separated organic layer is extracted with a 10% sodium hydroxide aqueous solution. A solid deposited by neutralizing the aqueous layer with hydrochloric acid is extracted with an organic solvent (for example, ethyl acetate). The extract is concentrated and, as required, recrystallized to obtain Compound ($A_1'$) containing an acyl group and a hydroxyl group. When methylthiobenzene is used instead of anisole in the above reaction, Compound ($A_1'$) has a thiol group.

The position(s) where the sulfonic acid group(s) are introduced and the amount of the sulfonic acid group(s) introduced in the ultimately obtained polyarylene of the invention can be controlled by adjusting the position and the number of hydroxyl groups (or thiol groups) replaced on the aromatic ring of Compound ($A_1'$). Specifically, the position(s) and the amount of the sulfonic acid group(s) introduced in the ultimately obtained polyarylene of the invention can be controlled by using benzene in which the specific positions are substituted with OR groups or SR groups (wherein R is, for example, a hydrogen atom or an alkyl group such as a methyl group, an ethyl group, and a t-butyl group) in the Friedel-Crafts acylation reaction.

(ii) Introduction of Protective Group

For example, Compound ($A_1'$) and 2H-dihydropyrane in an amount 1 to 20 times the molar amount of Compound ($A_1'$) are dissolved in toluene in the presence of an acid catalyst (for example, a cation exchange resin) and the mixture is stirred at room temperature for 1 to 24 hours. Next, after removing the acid catalyst and condensing the toluene solution, the reaction product is recrystallized, as required, to obtain Compound ($A_1$) having a tetrahydro-2-pyranyl group introduced therein as a protective group. When methylthiobenzene is used instead of anisole in the above reaction, the tetrahydro-2-pyranyl group functions as a protective group of the thiol.

The following compounds can be given as examples of Compound ($A_1$) shown by formula (6).

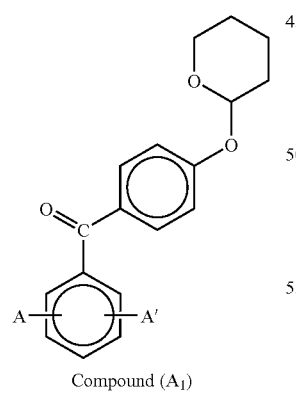

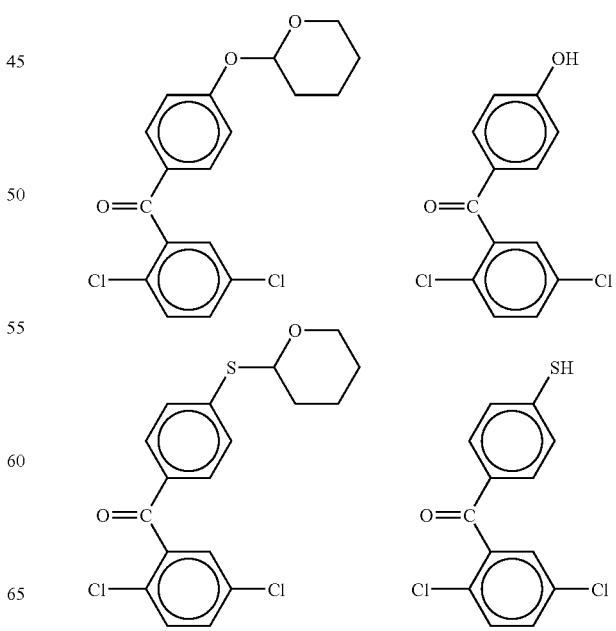

-continued

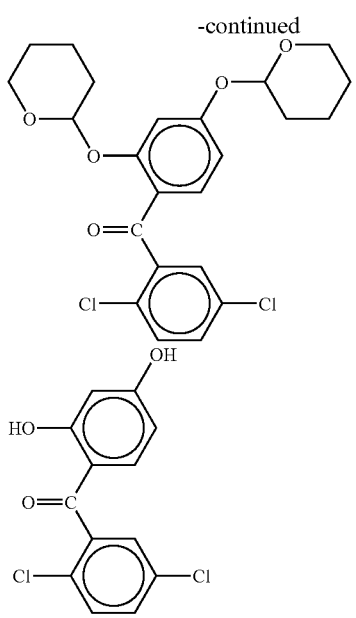

Also given as other examples of Compound ($A_1$) shown by the formula (6) are a compound in which the chlorine atom is replaced with a bromine atom or an iodine atom in the above compounds, a compound in which the —CO— is replaced with —$SO_2$— in the above compounds, and a compound in which the chlorine atom is replaced with a bromine atom or an iodine atom and the —CO— is replaced with —$SO_2$— in the above compounds.

2.1.2. Compound ($A_2$)

As specific examples of Compound ($A_2$) shown by formula (7), when m=0, 4,4'-dichlorobenzophenone; 4,4'-dichlorobenzanilide; bis(chlorophenyl)difluoromethane; 2,2-bis(4-chlorophenyl)hexafluoropropane; 4-chlorophenyl-4-chlorobenzoate; bis(4-chlorophenyl)sulfoxide; bis(4-chlorophenyl)sulfone; a compound in which the chlorine atom is replaced with a bromine atom or an iodine atom in these compounds; and a compound in which at least one halogen atom substituted on the four position is substituted on the three position can be given.

As specific examples of Compound ($A_2$) shown by formula (7), when m=1, 4,4'-bis(4-chlorobenzoyl)diphenyl ether; 4,4'-bis(4-chlorobenzoylamino)diphenyl ether; 4,4'-bis(4-chlorophenylsulfonyl)diphenyl ether; 4,4'-bis(4-chlorophenyl)diphenyl ether dicarboxylate; 4,4'-bis[(4-chlorophenyl)-1,1,1,3,3,3-hexafluoropropyl]diphenyl ether; 4,4'-bis[(4-chlorophenyl)-1,1,1,3,3,3-hexafluoropropyl]diphenyl ether; 4,4'-bis[(4-chlorophenyl)tetrafluoroethyl]diphenyl ether; a compound in which the chlorine atom is replaced with a bromine atom or an iodine atom in these compounds; a compound in which the halogen atom substituted on the four position is substituted on the three position; and a compound in which the group substituted on the four position of diphenyl ether in these compounds is substituted on the three position can be given.

As further examples of Compound ($A_2$) shown by formula (7), 2,2-bis[4-{4-(4-chlorobenzoyl)phenoxy}phenyl]-1,1,1,3,3,3-hexafluoropropane; bis[4-{4-(4-chlorobenzoyl)phenoxy}phenyl]sulfone; and compounds of the following formulas can be given.

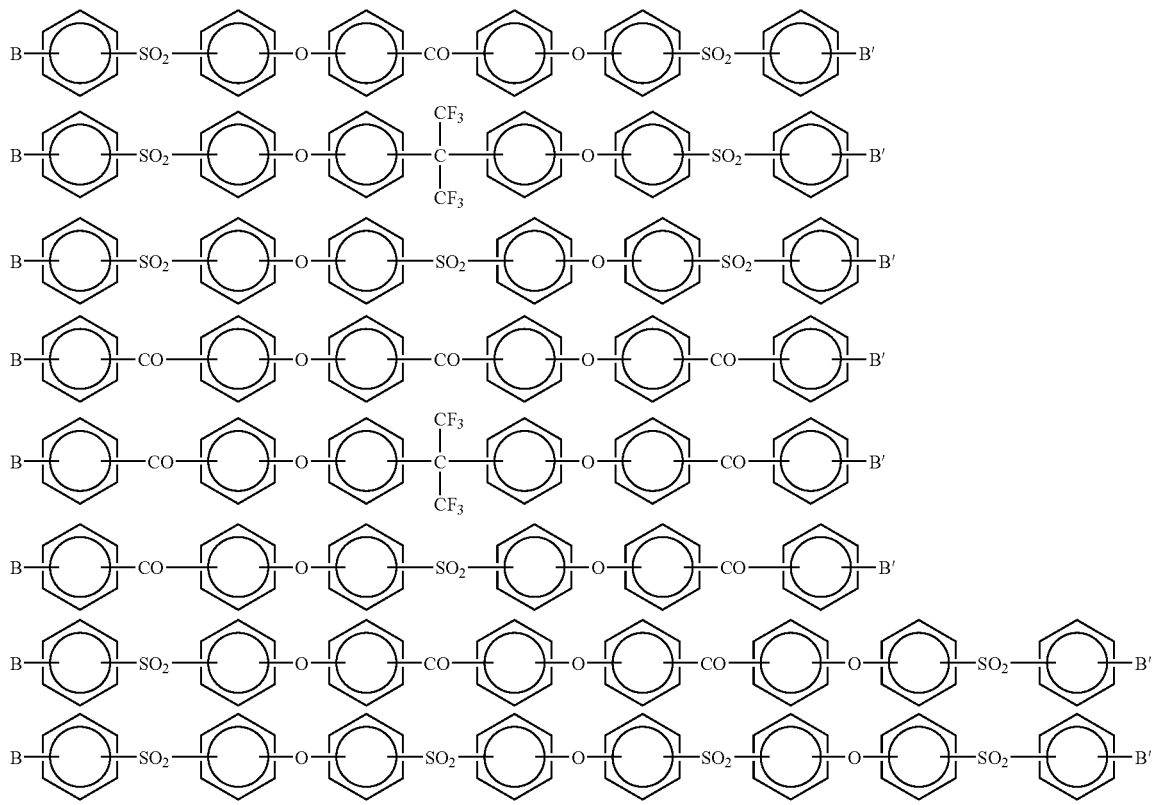

-continued

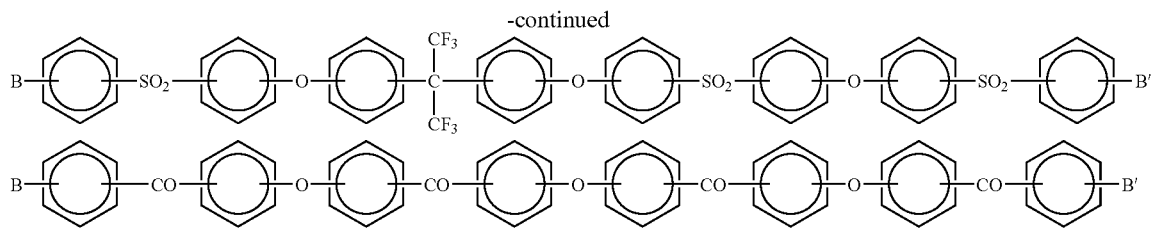

Compound (A₂) shown by formula (7) can be produced by the following method, for example.

with a phenoxide, the target compound with activated chlorine atoms at the terminals can be easily obtained.

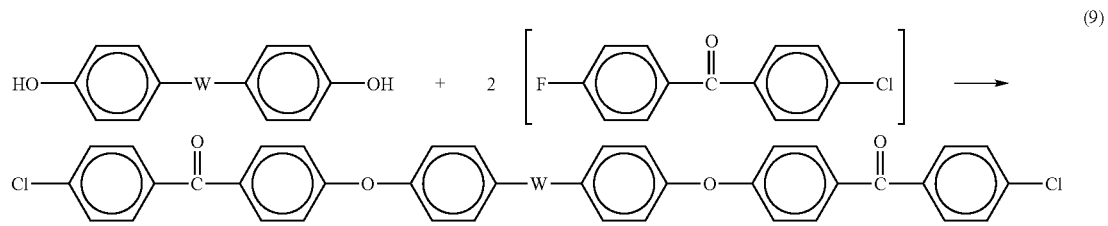

(9)

First, in order to make a bisphenol connected with an electron-drawing group into the corresponding alkali metal salt of the bisphenol, an alkali metal such as lithium, sodium, or potassium, an alkali metal hydride, an alkali metal hydroxide, or an alkali metal carbonate is added in a polar solvent with a high dielectric constant such as N-methyl-2-pyrrolidone, N,N-dimethylacetamide, sulfolane, diphenylsulfone, or dimethylsulfoxide.

An excess amount of an alkali metal, usually 1.1 to 2 times equivalent, and preferably 1.2 to 1.5 times equivalent of the hydroxyl group of phenol, is used. In this case, an aromatic dihalide compound substituted by a halogen atom activated with an electron-drawing group such as fluorine and chlorine, for example, 4,4'-difluorobenzophenone; 4,4'-dichlorobenzophenone; 4,4'-chlorofluorobenzophenone; bis(4-chlorophenyl)sulfone; bis(4-fluorophenyl)sulfone; 4-fluorophenyl-4'-chlorophenylsulfone; bis(3-nitro-4-chlorophenyl) sulfone; 2,6-dichlorobenzonitrile; 2,6-difluorobenzonitrile; hexafluorobenzene; decafluorobiphenyl; 2,5-difluorobenzophenone; or 1,3-bis(4-chlorobenzoyl)benzene, is reacted in the presence of an azeotrope with water such as benzene, toluene, xylene, hexane, cyclohexane, octane, chlorobenzene, dioxane, tetrahydrofuran, anisole, or phenetole. Although a fluorine compound is preferable in view of reactivity, taking the succeeding aromatic coupling reaction into consideration, it is necessary to design the aromatic nucleophilic substitution reaction so that a compound having a chlorine atom at the terminal can be obtained. The activated aromatic dihalide is used in an amount 2 to 4 times, and preferably 2.2 to 2.8 times the molar amount of bisphenol. The bisphenol may be converted into an alkali metal salt before the aromatic nucleophilic substitution reaction. The reaction is carried out at 60 to 300° C., and preferably at 80 to 250° C. The reaction time is from 15 minutes to 100 hours, and preferably from 1 to 24 hours. The best way is to use a chloro-fluoro compound having halogen atoms each having different reactivity from the other shown by the following formula as an active aromatic dihalide. Since the fluorine atom has priority in the nucleophilic substitution reaction wherein W is the same as defined in formula (2).

Alternatively, Compound (A₂) can be obtained by using a method of synthesizing a flexible polymer having the target electron-drawing group and electron-donating group by combining the nucleophilic substitution reaction with the electrophilic substitution reaction, as described in JP-A-2-159.

Specifically, an aromatic bishalide activated with an electron-drawing group, for example, bis(4-chlorophenyl)sulfone, is reacted with phenol by a nucleophilic substitution reaction to obtain a bisphenoxy substitution product. This substitution product is then reacted by a Friedel-Crafts reaction with 4-chlorobenzoic acid chloride, for example, to obtain the target compound. As the aromatic bishalide activated with an electron-drawing group used here, the compounds mentioned above can be given. Although the phenol compound may be substituted, an unsubstituted compound is preferred in view of heat resistance and flexibility. An alkali metal compound is preferably used in the phenol substitution reaction. The compounds described above can be used as the alkali metal compound. The amount used is 1.2 to 2 mols per one mol of phenol. The above-described polar solvents or azeotropes with water can be used in the reaction. Chlorobenzoic acid chloride is reacted as an acylating agent with a bisphenoxy compound in the presence of an activator of a Friedel-Crafts reaction of Lewis acid such as aluminum chloride, boron trifluoride, or zinc chloride. The chlorobenzoic acid chloride is used in an amount 2 to 4 times, and preferably 2.2 to 3 times, the molar amount of the bisphenoxy compound. The Friedel-Crafts activator is used in an amount of 1.1 to 2 times equivalent for 1 mol of the active halide compound of an acylating agent such as chlorobenzoic acid. The reaction is carried out for 15 minutes to 10 hours at −20° C. to 80° C. A solvent inactive in the Friedel-Crafts reaction (for example, chlorobenzene or nitrobenzene) can be used.

The polymer comprising Compound (A₂) shown by formula (7) in which m=2 or more, is a compound obtained by combining, for example, a bisphenol which serves as a supply source of the ether oxygen, which is the electron-donating group T in formula (7), and >C=O, —SO₂—, and/or >C(CF$_3$)$_2$, which are electron-drawing groups W. This compound can be obtained by sequentially carrying out a substitution reaction of an alkali metal salt of 2,2-bis(4-hydroxyphenyl)-1,1,1,3,3,3-hexafluoropropane; 2,2-bis(4-hydroxyphenyl)ketone; or 2,2-bis(4-hydroxyphenyl)sulfone; with an activated aromatic halogenated compound such as an excess amount of 4,4-dichlorobenzophenone or bis(4-chlorophenyl)sulfone in the presence of a polar solvent such as N-methyl-2-pyrrolidone; N,N-dimethylacetamide; or sulfolane.

The compounds shown by the following formulas can be given as examples of such a compound.

As examples of the transition metal salt, nickel compounds such as nickel chloride, nickel bromide, nickel iodide, and nickel acetylacetonate; palladium compounds such as palladium chloride, palladium bromide, and palladium iodide; iron compounds such as iron chloride, iron bromide, and iron iodide; and cobalt compounds such as cobalt chloride, cobalt bromide, and cobalt iodide can be given. Of these, nickel chloride and nickel bromide are preferable.

As examples of the ligand component, triphenylphosphine; 2,2'-bipyridine; 1,5-cyclooctadiene, and 1,3-bis(diphenylphosphino)propane can be given. Of these, triphenylphos-

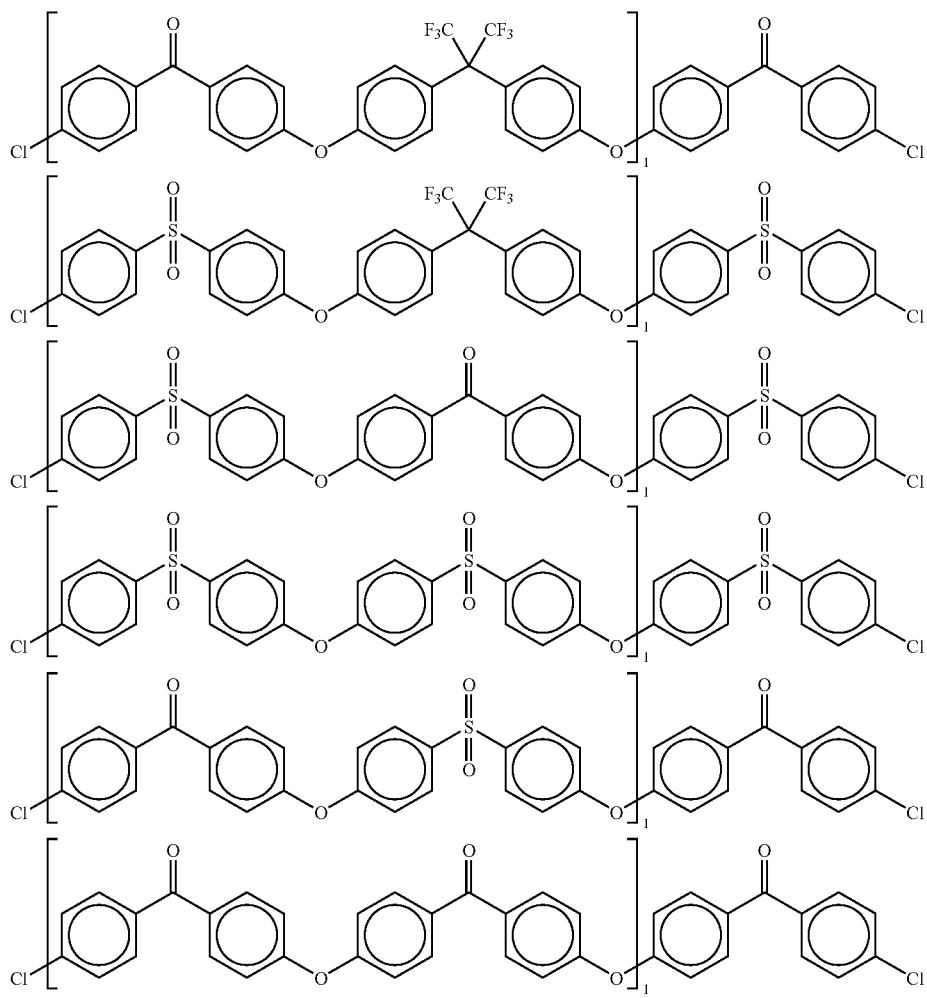

wherein l is 2 or more, and preferably 2 to 100.

2.1.3. Catalyst and Other Components

The catalyst used when polymerizing Compound (A$_1$) as a monomer or polymerizing Compound (A$_1$) and Compound (A$_2$) as monomers comprises a transition metal compound and contains (i) a salt of a transition metal and a compound functioning as a ligand Hereinafter referred to as "ligand component") or a transition metal complex in which a ligand is conjugated (including a copper salt) and (ii) a reducing agent as essential components, and may further contain a "salt" in order to increase the polymerization reaction rate.

phine and 2,2'-bipyridine are preferable. These ligand component compounds may be used either individually or in combinations of two or more.

As examples of the transition metal complex in which a ligand is conjugated, bis(triphenylphosphine) nickel chloride; bis(triphenylphosphine) nickel bromide; bis(triphenylphosphine) nickel iodide; bis(triphenylphosphine) nickel nitrate; (2,2'-bipyridine) nickel chloride; (2,2'-bipyridine) nickel bromide; (2,2'-bipyridine) nickel iodide; (2,2'-bipyridine) nickel nitrate; bis(1,5-cyclooctadiene) nickel; tetrakis (triphenylphosphine) nickel; tetrakis(triphenylphosphite) nickel; and tetrakis(triphenylphosphine) palladium can be given. Of these, bis(triphenylphosphine) nickel chloride and (2,2'-bipyridine) nickel chloride are preferable.

As examples of the reducing agent used in the catalyst, iron, zinc, manganese, aluminum, magnesium, sodium, and calcium can be given. Of these, zinc, magnesium, and manganese are preferable. These reducing agents can be used in a more activated state by causing them to come in contact with an acid such as an organic acid.

As examples of the "salt" used in the catalyst, sodium compounds such as sodium fluoride, sodium chloride, sodium bromide, sodium iodide, and sodium sulfate; potassium compounds such as potassium fluoride, potassium chloride, potassium bromide, potassium iodide, and potassium sulfate; and ammonium compounds such as tetraethylammonium fluoride, tetraethylammonium chloride, tetraethylammonium bromide, tetraethylammonium iodide, and tetraethylammonium sulfate can be given. Among these, sodium bromide, sodium iodide, potassium bromide, tetraethylammonium bromide, and tetraethylammonium iodide are preferable.

Among the above components, the transition metal salt or transition metal complex is used in an amount of usually from 0.0001 to 10 mols, and preferably from 0.01 to 0.5 mols for one mol of the total amount of the monomers. If less than 0.0001 mols, the polymerization reaction may not sufficiently proceed, and if more than 10 mols, the molecular weight may be low.

When the transition metal salt and the ligand component are used in the catalyst, the amount of the ligand component is usually from 0.1 to 100 mols, and preferably from 1 to 10 mols, per one mol of the transition metal salt. If less than 0.1 mols, the catalytic activity may not be sufficient. If more than 100 mols, the molecular weight may be low.

The amount of the reducing agent is usually from 0.1 to 100 mols, and preferably from 1 to 10 mols, for one mol of the total amount of the monomers. If less than 0.1 mols, the polymerization may not sufficiently proceed, and if more than 100 mols, purification of the resulting polymer may be difficult.

When the "salt" is used, the amount is usually from 0.001 to 100 mols, and preferably from 0.01 mols to 1 mol for one mol, of the total amount of the monomers. If less than 0.001 mols, the effect of accelerating the polymerization rate may not be sufficient, and if more than 100 mols, purification of the resulting polymer may be difficult.

As examples of the polymerization solvent that can be used, tetrahydrofuran, cyclohexanone, dimethylsulfoxide, N,N-dimethylformamide, N,N-dimethylacetamide, N-methyl-2-pyrrolidone, gamma-butyrolactone, sulfolane, gamma-butyrolactam, dimethylimidazolidinone, and tetramethylurea can be given. Of these, tetrahydrofuran, N,N-dimethylformamide, N,N-dimethylacetamide, and N-methyl-2-pyrrolidone are preferable. These polymerization solvents are preferably used after sufficiently drying.

The concentration of the monomers in the polymerization solvent is usually from 1 to 90 wt %, and preferably from 5 to 40 wt %.

The polymerization temperature is usually from 0 to 200° C., and preferably from 50 to 120° C. The reaction time is usually from 0.5 to 100 hours, and preferably from 1 hour to 40 hours.

One example of the reaction to obtain the above Compound (A) from Compound ($A_1$) and Compound ($A_2$) is shown in the following formula (10). In the following formula, x and y are positive integers. As shown in the following formula (10), Compound (A') is firstly produced by reacting Compound ($A_1$) with Compound ($A_2$). Then, $R^9$ is removed from Compound (A') to obtain Compound (A).

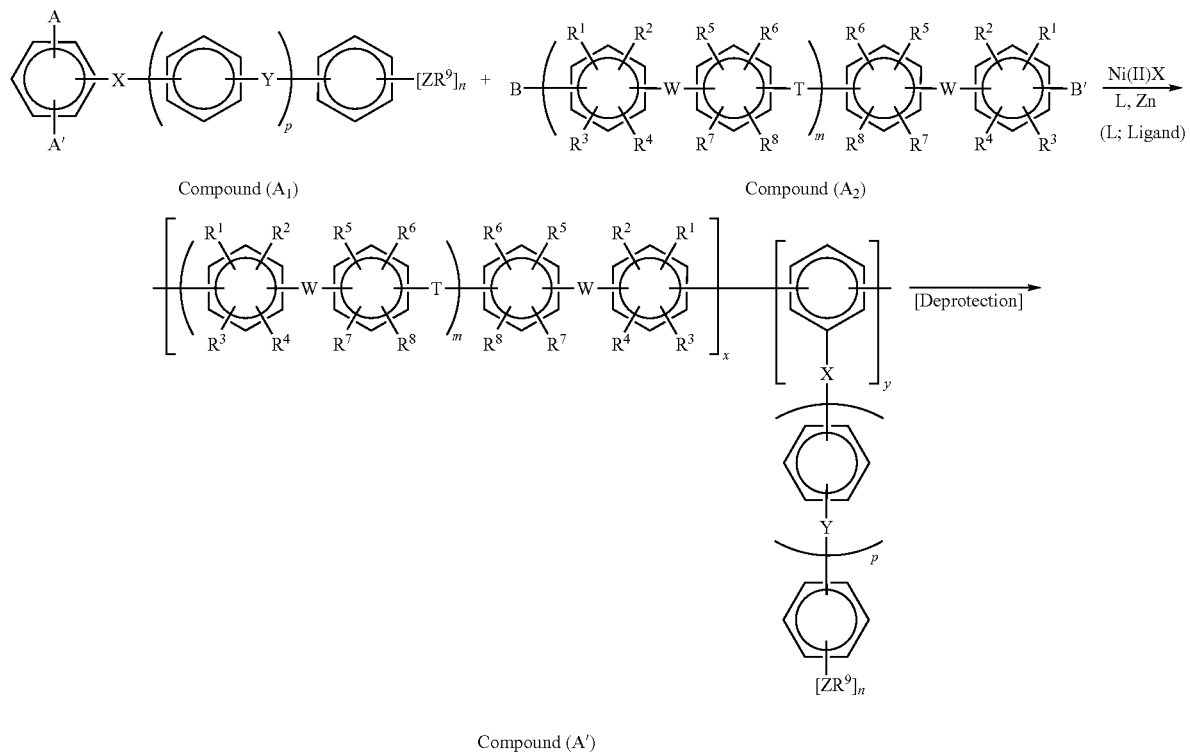

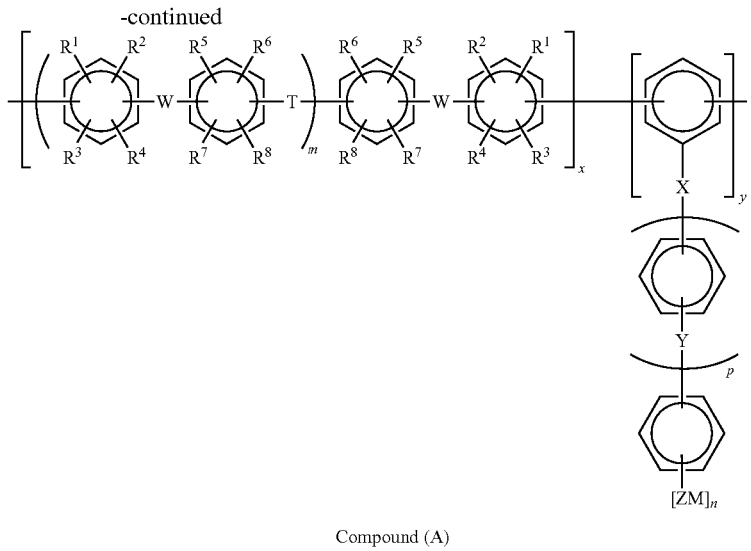

Compound (A)

Specifically, it is preferable to obtain Compound (A) by reacting 0.5 to 100 mol % (preferably 10 to 99.999 mol %) of at least one compound ($A_1$) shown by the above formula (6) with 0 to 99.5 mol % (preferably 0.001 to 90 mol %) of at least one compound ($A_2$) shown by the above formula (7) in the presence of a catalyst.

2.2. Compound (B)

Compound (B) has a structural unit shown by the following formula (4),

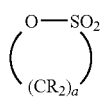 (4)

wherein R and a are the same as defined in formula (1).

The compounds shown by the following formulas can be given as examples of Compound (B).

In producing the polyarylene of the invention, the position(s) where the sulfonic acid group(s) are introduced and the amount of the sulfonic acid group(s) introduced in the ultimately obtained polyarylene of the invention can be controlled by adjusting the number of carbon atoms in Compound (B), that is, the value of a in the above formula (4).

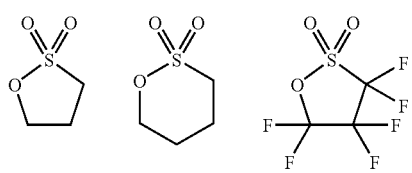

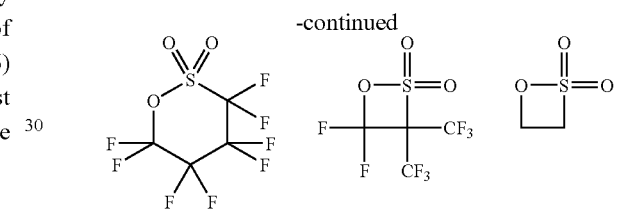

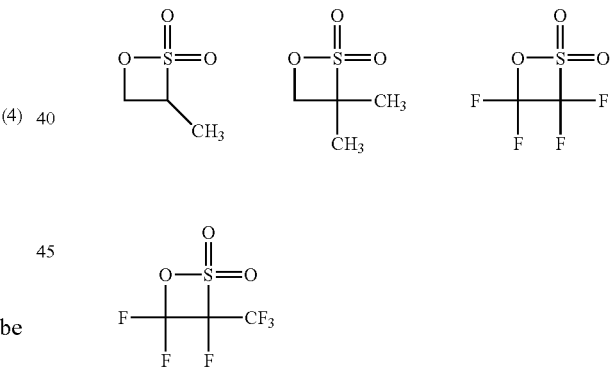

2.3. Synthesis of Compound (A) and Compound (B)

The polyarylene having a sulfonic acid group of the invention can be obtained by reacting Compound (A) containing the structural unit shown by the above formula (3) with Compound (B) shown by the above formula (4).

An example of synthesizing Compound (A) and Compound (B) is shown below. The reaction of Compound (A) and Compound (B) is carried out by, for example, dissolving Compound (A) and Compound (B) in a solvent under basic conditions as shown in the following reaction formula (11).

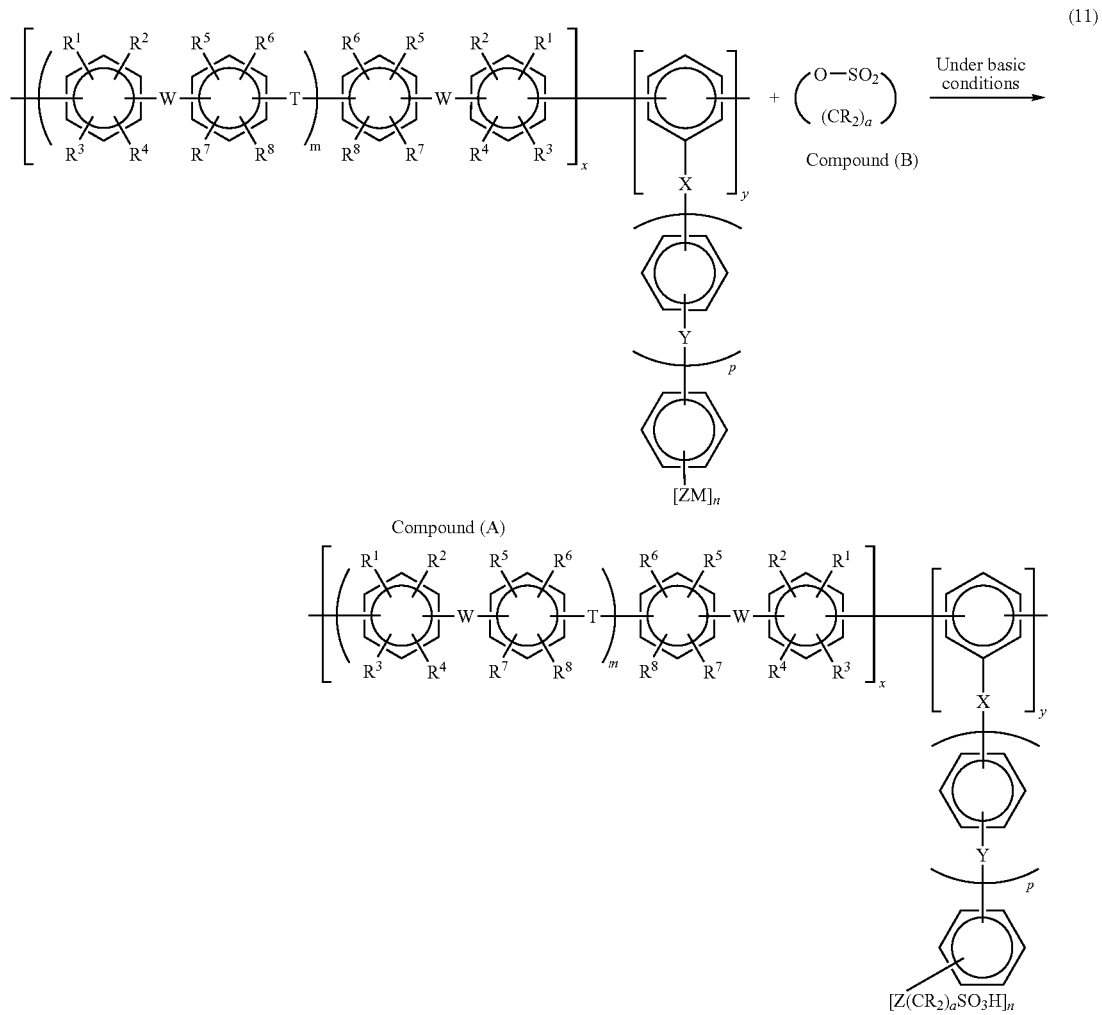

For example, when M in Compound (A) is a hydrogen atom (see formula (3)), Compound (A) can be converted into an alkali metal salt by adding, as required, an alkali metal, an alkali metal hydride, an alkali metal hydroxide, or an alkali metal carbonate in a polar solvent with a high dielectric constant such as N-methyl-2-pyrrolidone, N,N-dimethylacetamide, sulfolane, diphenylsulfone, or dimethylsulfoxide.

Lithium, sodium, and potassium can be given as the alkali metal. A hydride, hydroxide, and carbonate of these alkali metals can be respectively given as the alkali metal hydride, alkali metal hydroxide, and the alkali metal carbonate.

The alkali metal is added in an excess amount of the amount of sulfonic acid group in Compound (A), usually 1.1 to 4 times equivalent, and preferably 1.2 to 3 times equivalent the amount of sulfonic acid group.

In the reaction of Compound (A) and Compound (B), Compound (B) is decyclized under basic conditions by the nucleophilic substitution reaction of the oxygen atom or the sulfur atom shown by Z in Compound (A) with the carbon atom adjacent to the oxygen atom of Compound (B). A specific example of the reaction is shown in the following formula (12). Compound (A), Compound (B), and the alkali reagent are not limited to the compounds shown in the formula.

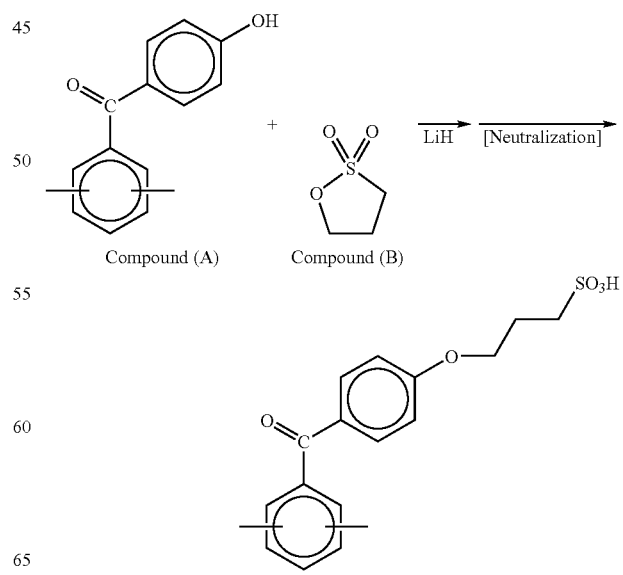

2.4. Compound (C)

Compound (C) has a structural unit shown by the following formula (5).

$$L\text{-}(CR_2)_a\text{—}SO_3M \tag{5}$$

wherein R and a are the same as defined in formula (1), and L represents a chlorine atom, a bromine atom, or an iodine atom.

The compounds shown by the following formulas can be given as examples of Compound (C), wherein Na may be K, Li, or H, and Cl may be Br or I.

| | |
|---|---|
| ClCH$_2$SO$_3$Na | ClCH$_2$CH$_2$CH$_2$SO$_3$Na |
| ClCH$_2$CH$_2$SO$_3$Na | ClCH$_2$CH$_2$CH$_2$CH$_2$SO$_3$Na |
| ClCF$_2$SO$_3$Na | ClCF$_2$CF$_2$CF$_2$SO$_3$Na |
| ClCF$_2$CF$_2$SO$_3$Na | ClCF$_2$CF$_2$CF$_2$CF$_2$SO$_3$Na |

In producing the polyarylene of the invention, the position(s) where the sulfonic acid group(s) are introduced and the amount of the sulfonic acid group(s) introduced in the ultimately obtained polyarylene of the invention can be controlled by adjusting the number of carbon atoms in Compound (C), that is, the value of a in the above formula (5).

2.5. Synthesis of Compound (A) and Compound (C)

The polyarylene having a sulfonic acid group of the invention can be obtained by reacting Compound (A) containing the structural unit shown by the above formula (3) with Compound (C) shown by the above formula (5).

An example of synthesizing Compound (A) and Compound (C) is shown below. The reaction of Compound (A) and Compound (C) is carried out by, for example, dissolving Compound (A) and Compound (C) in a solvent under basic conditions as shown in the following reaction formula (13).

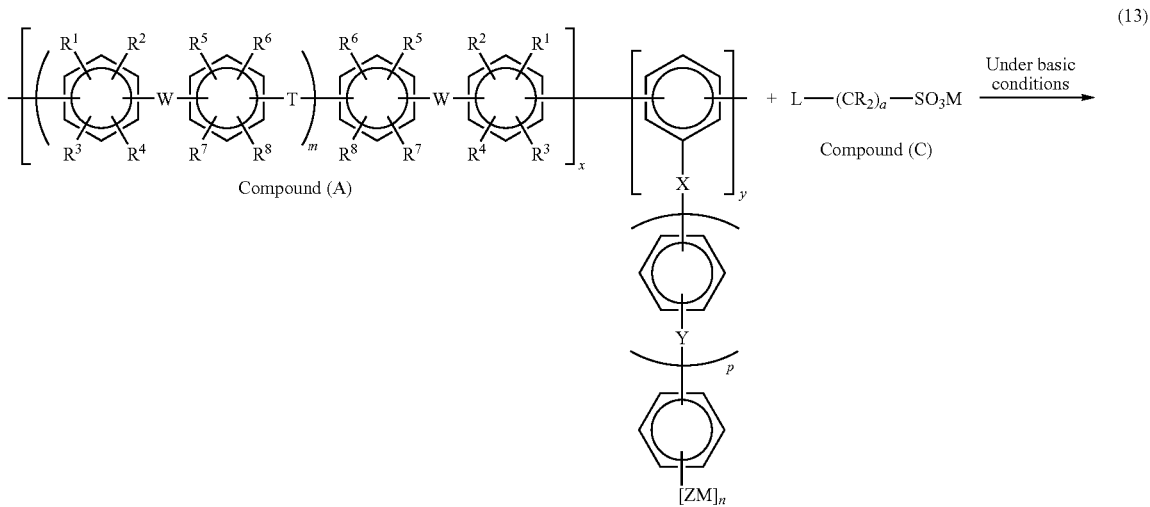

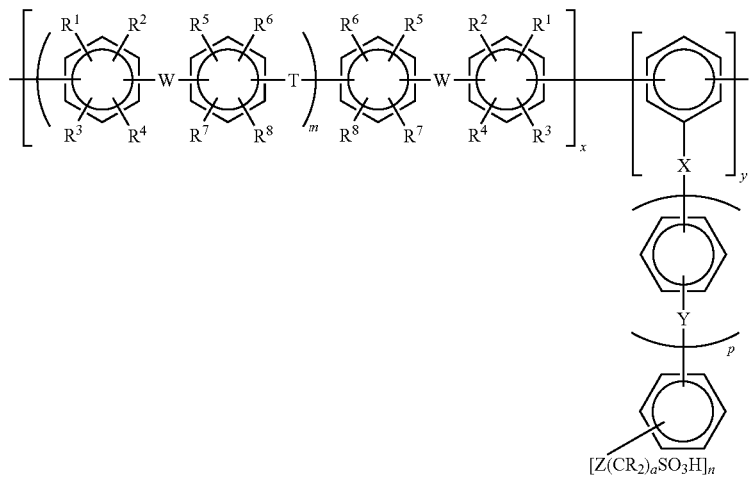

(13)

The polar solvents and alkaline reagents previously given in connection with the reaction of Compound (A) and Compound (B) are used in the reaction of Compound (A) and Compound (C).

In the reaction of Compound (A) and Compound (C), the oxygen atom or the sulfur atom shown by Z in Compound (A) causes a nucleophilic substitution reaction of the carbon atom adjacent to the oxygen atom of Compound (B) under the basic conditions. A specific example of this reaction is shown in the following formula (14). Compound (A), Compound (C), and the alkali reagent are not limited to the compounds shown in the formula.

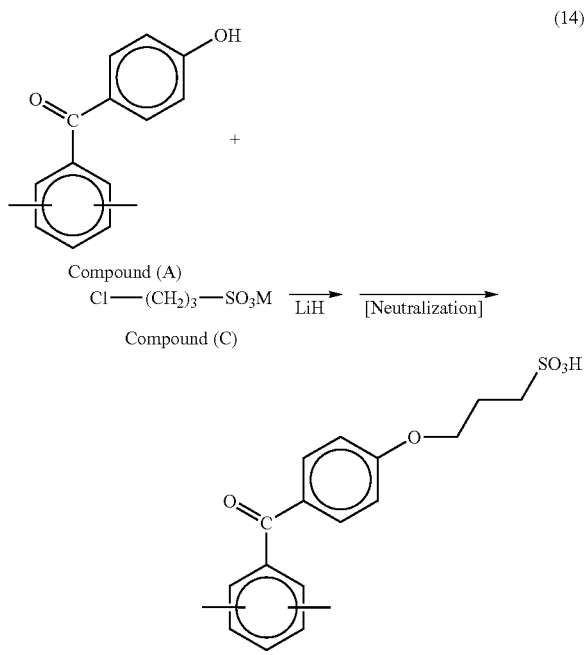

3.1. Solid Polyelectrolyte and Proton-Conductive Film

The solid polyelectrolyte and the proton-conductive film of the invention comprise the polyarylene having a sulfonic acid group of the invention. When preparing a proton-conductive film from the polyarylene of the invention, an inorganic acid such as sulfuric acid and phosphoric acid, an organic acid including carboxylic acid, and an appropriate amount of water can be used in addition to the polyarylene of the invention.

The proton-conductive film of the invention can be produced by producing a solution by dissolving the polyarylene of the invention in a solvent and forming a film by a method of casting the solution on a substrate (casting method), for example. There are no specific limitations to the substrate. Any substrates commonly used for casting solutions such as a plastic substrate and a metal substrate, preferably those made from a thermoplastic resin such as a polyethyleneterephthalate (PET) film, can be used.

As examples of the solvent used for dissolving the polyarylene of the invention, non-protonic polar solvents such as N-methyl-2-pyrrolidone, N,N-dimethylformamide, gamma-butyrolactone, N,N-dimethylacetamide, dimethylsulfoxide, dimethylurea, and dimethylimidazolydinone can be given. N-methyl-2-pyrrolidone (hereinafter referred to as "NMP") is particularly preferable from the viewpoint of solubility and solution viscosity. The non-protonic polar solvents can be used either individually or in combination of two or more.

A mixture of the non-protonic polar solvent and an alcohol may be used as a solvent for dissolving the polyarylene of the invention. As examples of the alcohol, methanol, ethanol, propyl alcohol, iso-propyl alcohol, sec-butyl alcohol, and tert-butyl alcohol can be given. Of these, methanol is preferable due to the effect of lowering solution viscosity in broad composition range. These alcohols can be used either individually or in combination of two or more.

When a mixture of a non-protonic polar solvent and an alcohol is used as a solvent, such solvent contains 25 to 95 wt %, and preferably 25 to 90 wt %, of the non-protonic polar solvent and 5 to 75 wt %, and preferably 10 to 75 wt %, of the alcohol, in the total 100 wt % of the solvent. The amount of alcohol in this range provides an excellent effect of lowering the solution viscosity.

Although the concentration of the polyarylene in the polyarylene solution varies according to the molecular weight of the polyarylene, that concentration is usually from 5 to 40 wt %, and preferably from 7 to 25 wt %. If less than 5 wt %, not only is it difficult to produce a thick film, but also pinholes are easily produced. On the other hand, if more than 40 wt %, the viscosity of the solution is too high to make a film. Even if a film is produced, the film may have poor surface smoothness.

Although the viscosity of the polyarylene solution varies according to the molecular weight of the polyarylene and the polymer concentration, the viscosity is usually from 2,000 to 100,000 mPa·s, and preferably from 3,000 to 50,000 mPa·s. If less than 2,000 mPa·s, the solution does not adequately stay on the substrate and may flow off the substrate. If more than 100,000 mPa·s, the viscosity is too high to be extruded from the die. It may be difficult to make a film by the casting method.

After forming the film as mentioned above, the resulting undried film is immersed in water to replace the organic solvent in the undried film with water. The amount of the solvent remaining in the resulting proton-conductive film can be reduced in this manner.

After film forming, it is possible to preliminary dry the undried film before immersing in water. The preliminary drying is carried out by maintaining the undried film usually at 50 to 150° C. for 0.1 to 10 hours.

The undried film can be immersed in water by a batch process in which the film is dipped sheet by sheet in water or by a continuous process in which the resulting film is dipped in a laminated state on a substrate (for example, PET) or after separating from the substrate, while being rolled up.

The batch process is preferably carried out by fixing the film on a frame in order to suppress formation of wrinkles on the surface.

When the undried film is immersed in water, an amount of water to make a contact ratio of 10 parts by weight or more, and preferably 30 parts by weight of more, per one part by weight of the undried film is used. In order to reduce the amount of residual solvent in the resulting proton-conductive film as much as possible, a large contact ratio is preferable. Replacing water used for immersion or constantly maintaining the concentration of the organic solvent in water at a level lower than a fixed concentration by causing the solution to overflow or the like is effective in reducing the amount of the residual solvent in the resulting proton-conductive film. In order to suppress fluctuation of the amount of the remaining organic solvent distributed in the proton-conductive film, it is effective to homogenize the concentration of the organic solvent by stirring or the like.

The temperature of the water in which the undried film is immersed is preferably 5 to 80° C. A high temperature may impair the surface conditions of the resulting proton-conductive film, since the higher the temperature, the larger the speed of replacing the organic solvent with water and the larger the amount of water adsorbed by the film. A water temperature in the range of 10 to 60° C. is desirable in view of the replacing speed and ease of handling.

The immersion time varies according to the amount of the residual solvent at the beginning, the contact ratio, and the temperature, but is usually from 10 minutes to 240 hours, and preferably from 30 minutes to 100 hours.

A proton-conductive film with a reduced amount of residual solvent can be obtained by drying the undried film after immersion in water. The amount of the residual solvent of the proton-conductive film obtained in this manner is usually 5 wt % or less.

The amount of the residual solvent in the proton-conductive film can be reduced to 1 wt % or less according to the immersion conditions. As such immersion conditions, there is a method in which the contact ratio of the undried film with water of 50 parts by weight or more of water per one part by weight of the undried film, a water temperature of 10 to 60° C., and an immersion time of 10 minutes to 10 hours, for example.

After immersion of the undried film in water in the above-described manner, the proton-conductive film of the invention can be obtained by drying the film at 30 to 100° C., and preferably at 50 to 80° C., for 10 to 180 minutes, and preferably 15 to 60 minutes, followed by vacuum drying at 50 to 150° C., and preferably under a reduced pressure of 500 mmHg to 0.1 mmHg for 0.5 to 24 hours.

Thickness of the dried film of the proton-conductive film of the invention obtained by the above-described process is usually from 10 to 100 micrometers, and preferably from 20 to 80 micrometers. The proton-conductive film of the invention may contain an aging preventive, preferably a hindered phenol compound with a molecular weights of 500 or more. The aging preventive can increase the durability of the proton-conductive film.

Examples of the hindered phenol compound with a molecular weight of 500 or more which can be used in the invention include triethylene glycol bis[3-(3-t-butyl-5-methyl-4-hydroxyphenyl)propionate] (IRGANOX 245™); 1,6-hexanediol bis[3-(3,5-di-t-butyl-4-hydroxyphenyl)propionate] (IRGANOX 259™); 2,4-bis(n-octylthio)-6-(4-hydroxy-3,5-di-t-butylanilino)-3,5-triazine (IRGANOX 565™); pentaerythrityltetrakis[3-(3,5-di-t-butyl-4-hydroxyphenyl)propionate] (IRGANOX 1010™); 2,2-thio-diethylene bis[3-(3,5-di-t-butyl-4-hydroxyphenyl)propionate] (IRGANOX 1035™); octadecyl-3-(3,5-di-t-butyl-4-hydroxyphenyl)propionate (IRGANOX 1076™); N,N-hexamethylene bis(3,5-di-t-butyl-4-hydroxyhydrocynnamide) (IRGAONOX 1098™); 1,3,5-trimethyl-2,4,6-tris(3,5-di-t-butyl-4-hydroxybenzyl) benzene (IRGANOX 1330™); tris(3,5-di-t-butyl-4-hydroxybenzyl)-isocyanurate (IRGANOX 3114™); and 3,9-bis[2-[3-(3-t-butyl-4-hydroxy-5-methylphenyl) propionyloxy]-1,1-dimethylethyl]-2,4,8,10-tetraoxaspiro [5.5]undecane (Sumilizer GA-80™).

It is preferable to use 0.01 to 10 parts by weight of the hindered phenol compound with a molecular weight of 500 or more per 100 parts by weight of the polyarylene of the invention.

The proton-conductive film of the invention can be used as a conductive film with proton conductivity, for example, as an electrolyte for primary batteries, an electrolyte for secondary batteries, a solid polyelectrolyte for fuel cells, display elements, various sensors, signal transfer media, solid capacitors, and a proton conductive films of ion exchange membrances.

4. EXAMPLES

The invention is described below in more detail by way of examples. However, the invention is not limited to the following examples. Measurements in the examples were carried out as follows. The polymer films (film samples) having a thickness of 40 micrometers were used in various measurements in the examples. These films were produced by casting a solution of polyarylene having a sulfonic acid group or sulfonic acid groups obtained in the examples in N-methylpyrrolidone at a concentration of 18%.

4.1. Measurement Items

4.1.1. Equivalent of Sulfonic Acid Group

The polyarylene produced was dried after removing any residual acids by washing with distilled water until the washing became neutral. After removing the remaining free acids, the polyarylene was sufficiently washed and dried. A predetermined amount of the polyarylene was dissolved in a mixed solvent of THF and water. The solution was titrated using a standard solution of NaOH and phenolphthalein as an indicator to determine the equivalent (ion exchange capacity) (meq/g) of the sulfonic acid group(s) from the neutralization point.

4.1.2. Proton Conductivity

The alternate current resistance was determined by preparing a strip with a width of 5 mm from the film sample, pressing platinum wires (phi=0.5 mm) against the surface of the film sample, and measuring the alternate current impedance between the platinum wires while maintaining the film sample in a thermo-hygrostat. The impedance at an alternate current of 10 kHz was measured at 85° C. and 90% RH. As a resistance measuring device, a chemical impedance measurement system manufactured by NF Corporation was used. JW241™ manufactured by Yamato Science was used as the thermo-hygrostat. The alternate current resistance was measured by providing five platinum wires at 5 mm intervals and changing the wire distance to 5 to 20 mm. The specific resistance of the film was calculated from the distance between the wires and the slope of the resistance. The alternate impedance was calculated from the inverse of the specific resistance, and the proton conductivity was determined using the impedance.

Specific resistance [omega·cm]=0.5 [cm]×Film thickness [cm]×Slope between wires [omega/cm]

4.1.3. Thermal Characteristics

Thermal decomposition initiation temperature The temperature at which the sulfonated polyarylene started to decompose measured using a TGA (under nitrogen atmosphere at a heating rate of 20° C./min) was used as the thermal decomposition initiation temperature (° C.).

Hot Water Resistance

A sample (a sulfonated polymer film) with a thickness of 40 micrometers was immersed in hot water at 95° C. for 48 hours to determine the ratio of the weight of the film after immersion to the weight before immersion. The result was used as the weight retention (%).

4.1.4. Fenton's Reagent Resistance

A hydrogen peroxide solution was diluted with purified water to a concentration of 3% and iron sulfate was dissolved to make the iron ion ($Fe^{2+}$) concentration 20 ppm. A sample (sulfonated polymer film) with a prescribed size was immersed in the solution and allowed to stand at 45° C. for 20 hours. The ratio of the weight of the film after immersion to the weight before immersion was used as the weight retention (%).

4.1.5. Molecular Weight Determination

The weight average molecular weight and the number average molecular weight of the polyarylene in the examples are polystyrene-reduced molecular weights determined by GPC using tetrahydrofuran (THF) as the solvent.

4.2. Example 1

(I) Synthesis of Benzophenone Derivative (Compound ($A_1'$-1))

(i) Synthesis of 2,5-dichloro-4'-hydroxybenzophenone

A 2-liter three-neck flask equipped with a stirrer, a nitrogen-introducing pipe, and a dropping funnel was charged with 64.9 g (600 mmol) of anisole and 480 ml of dichloromethane. After cooling in an ice water bath, 80 g (600 mmol) of aluminum chloride was added. Next, 125.7 g (600 mmol) of 2,5-dichlorobenzoic acid chloride was slowly added dropwise from the dropping funnel. After adding dropwise, 80 g (600 mmol) of aluminum chloride was added. The mixture was allowed to become room temperature and stirred for 12 hours.

The reaction mixture was added to 2 l of ice cooled water containing 300 ml of concentrated hydrochloric acid, and the separated organic layer was extracted with a 10% sodium hydroxide aqueous solution. On the other hand, the aqueous layer was neutralized with hydrochloric acid and the deposited solid was extracted with 2 l of ethyl acetate. The solvent was evaporated and the resulting solid was recrystallized from ethyl acetate to obtain 136.3 g (yield: 85%) of 2,5-dichloro-4'-hydroxybenzophenone (Compound ($A_1'$-1)). The $^1$H-NMR spectrum of Compound (A1'-1) is shown in FIG. 1.

(ii) Synthesis of 2,5-dichloro-4'-(tetrahydro-2-pyranyloxy) benzophenone (Compound ($A_1$-1))

Figure 2:
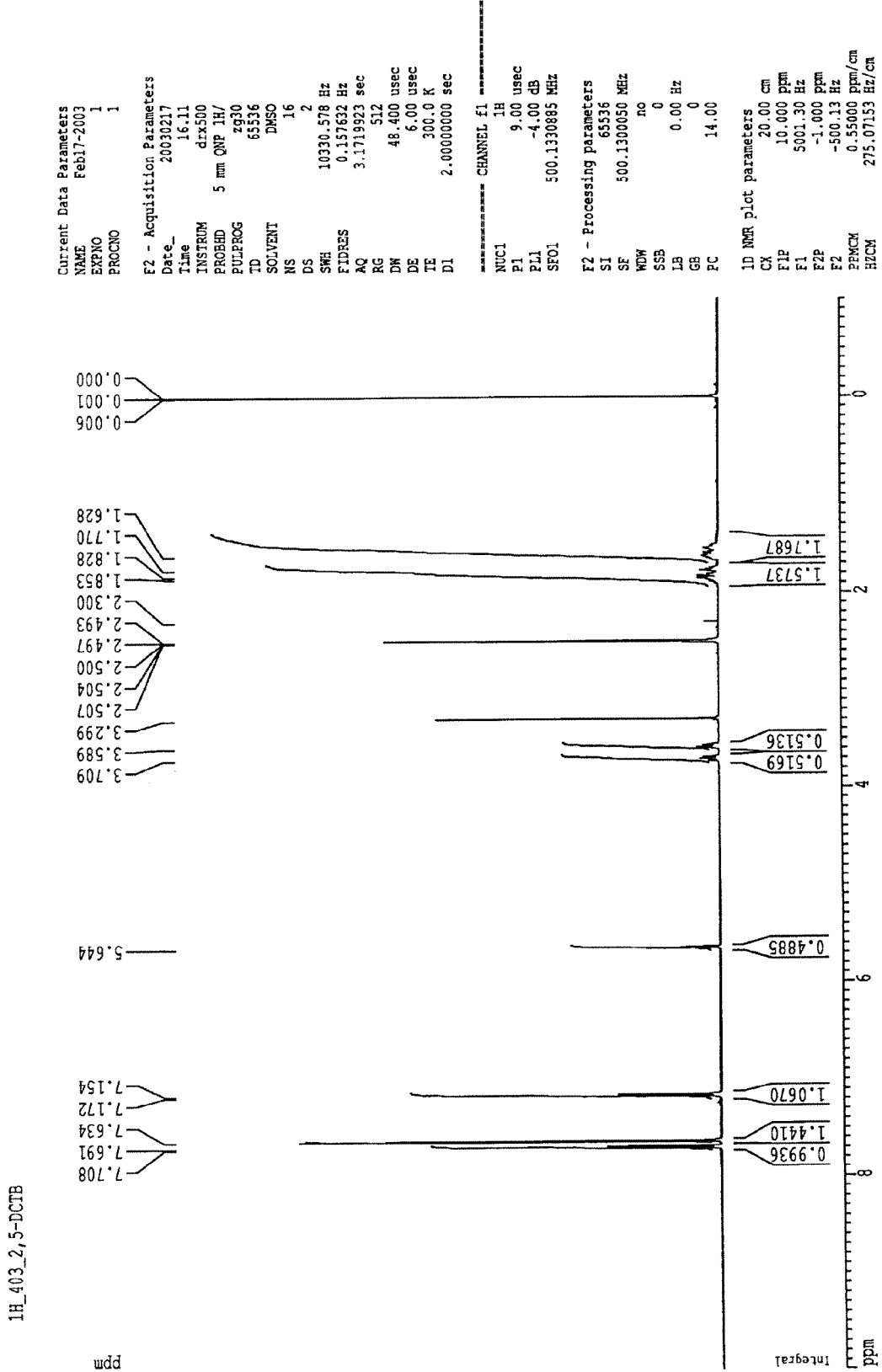
FIG. 2 is a $^1$H-NMR spectrum of a Compound ($A_1$-1) obtained in Example 1.

A flask was charged with 26.7 g (100 mmol) of 2,5-dichloro-4'-hydroxybenzophenone (Compound ($A_1'$-1)), 100 g (1,200 mmol) of 2H-dihydropyrane, and 100 ml of toluene. 1.5 g of a cation exchange resin (Amberlist 15) was added to the mixture while stirring. After continuing stirring for 5 hours at room temperature, the cation exchange resin was removed. The filtrate was washed with an aqueous solution of sodium hydroxide and a brine, and dried over magnesium sulfate, and the solvent was evaporated. The resulting solid was recrystallized from toluene to obtain 16.4 g (yield: 47%) of 2,5-dichloro-4'-(tetrahydro-2-pyranyloxy)benzophenone (Compound ($A_1$-1)). The $^1$H-NMR spectrum of Compound ($A_1$-1) is shown in FIG. 2. The processes (i) and (ii) in Example 1 are shown in the following formula (15).

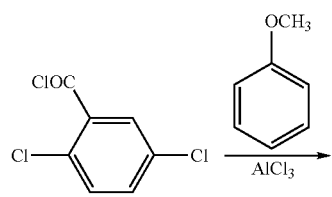

(15)

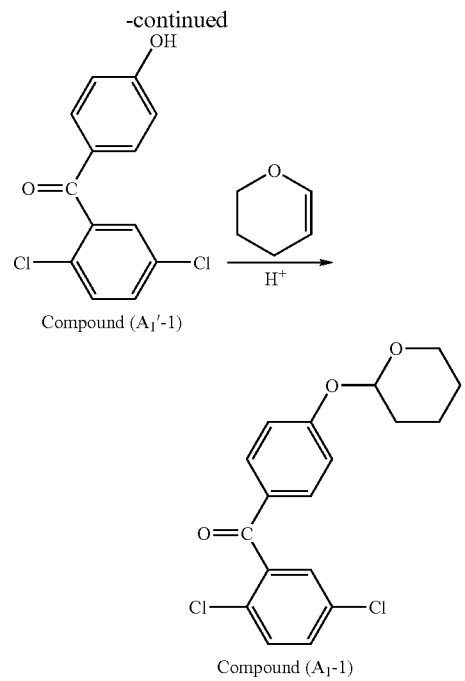

(II) Synthesis of Compound (A-1)

A 500 ml flask equipped with stirring blades, a thermometer, and a nitrogen-introducing pipe was charged with 15.6 g (44.4 mmol) of 2,5-dichloro-4'-(tetrahydro-2-pyranyloxy) benzophenone (Compound ($A_1$-1)); 6.55 g (0.585 mmol) of a polycondensate of 4,4'-dichlorobenzophenone-2,2-bis(4-hydroxyphenyl)-1,1,1,3,3,3-hexafluoropropane (number average molecular weight: 11,200); 0.883 g (1.35 mmol) of bis (triphenylphosphine) nickel dichloride; 0.877 g (5.85 mmol) of sodium iodide; 4.72 g (18 mmol) of triphenylphosphine; and 7.06 g (108 mmol) of zinc. The mixture was dried under vacuum. After replacing the inside of the flask with dry nitrogen, 52 ml of N,N-dimethylacetamide (DMAc) was added to initiate polymerization. The temperature of the reaction solution was controlled in the range of 70 to 90° C. during polymerization. After three hours, the reaction mixture was diluted with the addition of 200 ml of DMAc, and the insoluble components were removed by filtration to obtain a filtrate of the polymer solution.

Figure 3:
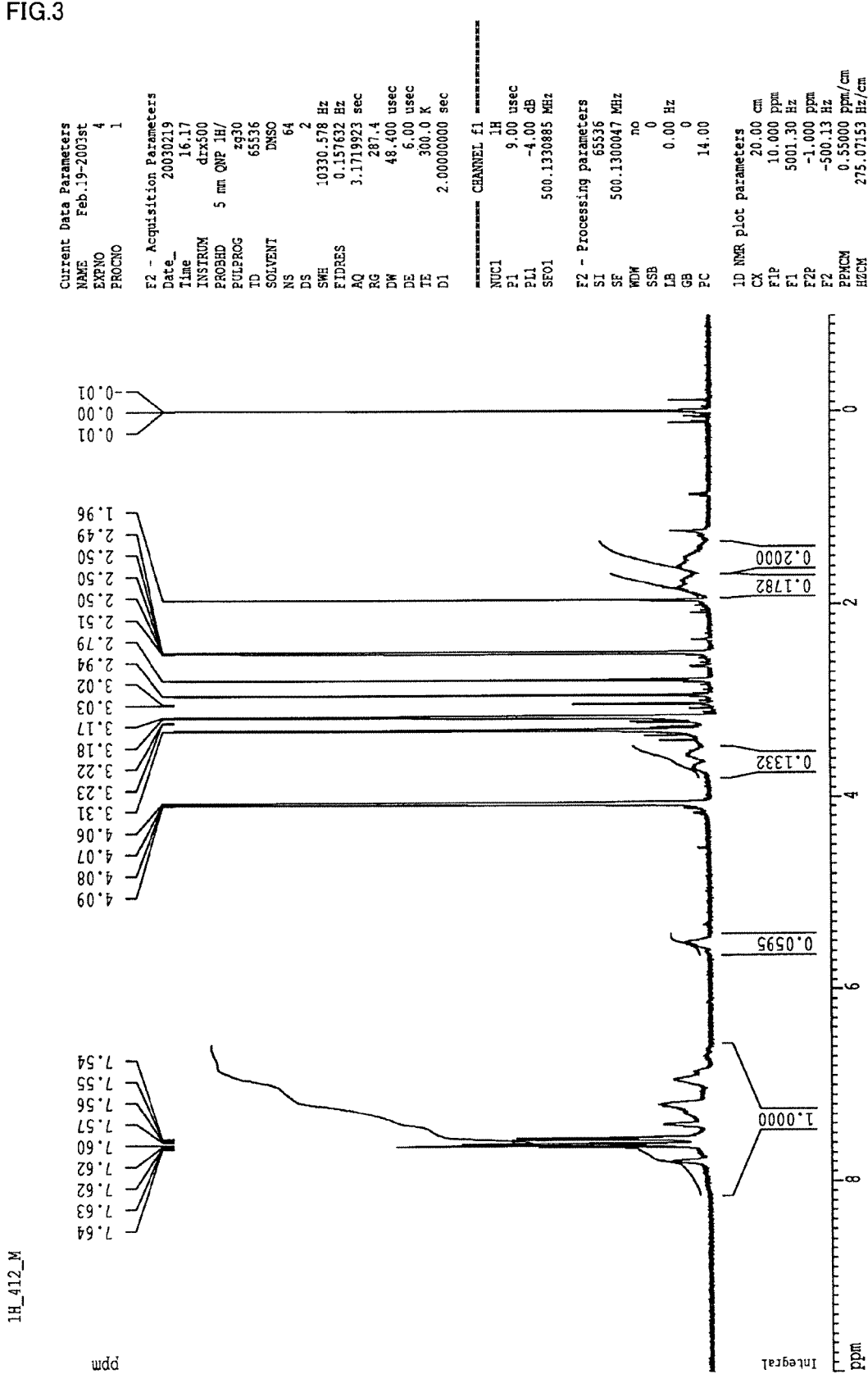
FIG. 3 is a $^1$H-NMR spectrum of a Compound (A'-1) obtained in Example 1.

A very small amount of the filtrate of the polymer solution was collected and poured into methanol to precipitate a polymer. The precipitate was separated by filtration and dried to obtain a solid, of which the $^1$H-NMR spectrum is shown in FIG. 3. Based on the $^1$H-NMR spectrum shown in FIG. 3, the solid was confirmed to have a tetrahydro-2-pyranyl group and the structure was estimated to be Compound (A'-1). The number average molecular weight and the weight average molecular weight of the solid determined by GPC were respectively 28,000 and 103,000.

Figure 4:
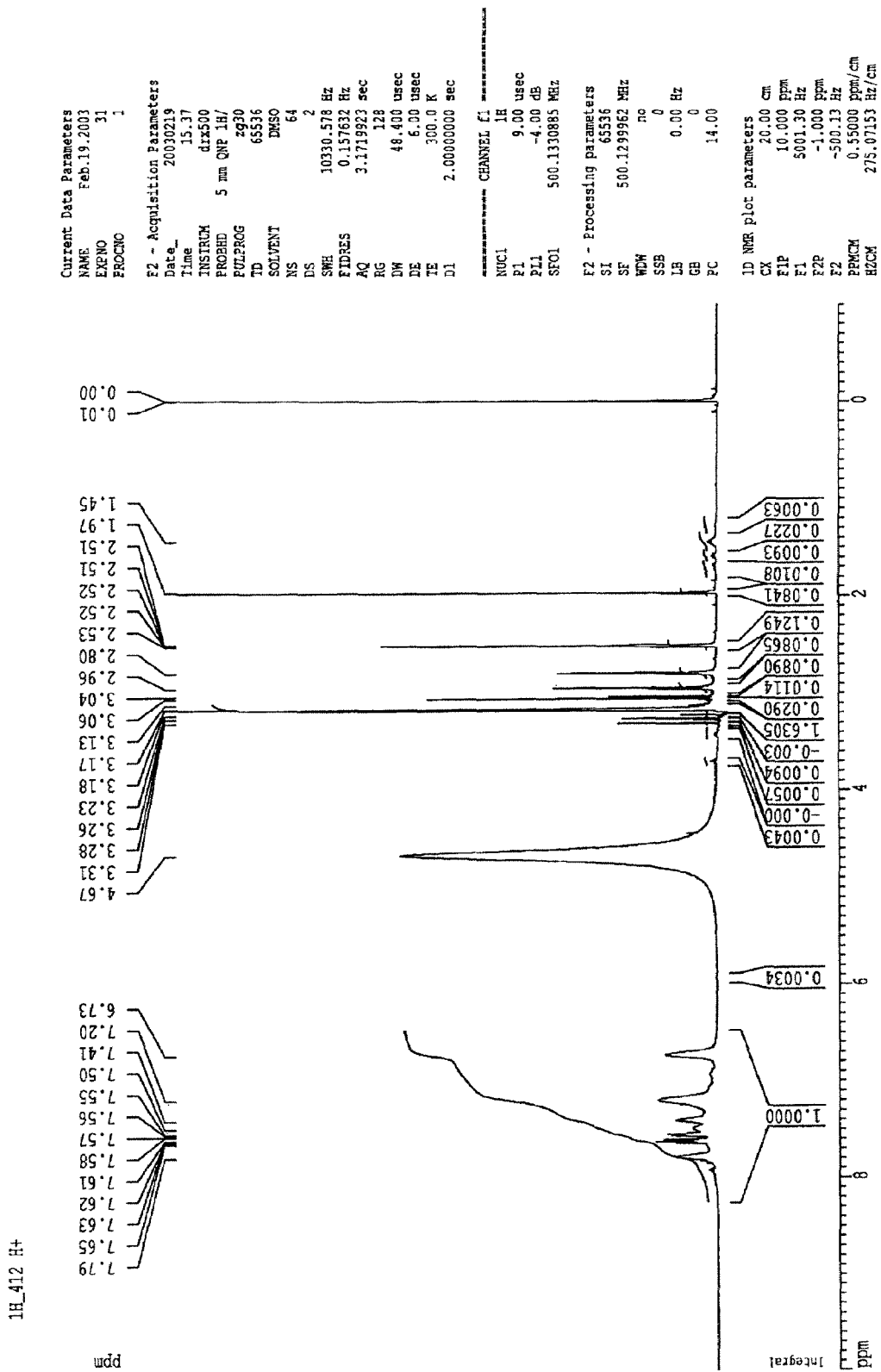
FIG. 4 is a $^1$H-NMR spectrum of a Compound (A-1) obtained in Example 1.

On the other hand, the remaining amount of the filtrate of the polymer solution was added to 1.5 l of methanol containing 10 vol % of concentrated hydrochloric acid to precipitate the polymer. After separating the precipitate by filtration, the resulting solid was dried to obtain 14.3 g of a polymer having a hydroxyl group (Compound (A-1)). The $^1$H-NMR spectrum of Compound (A-1) is shown in FIG. 4. The polymer was confirmed to have a hydroxyl group by the spectrum of FIG. 4. The process (II) in Example 1 is shown in the following formula (16), wherein d, e, and f are positive integers.

(16)

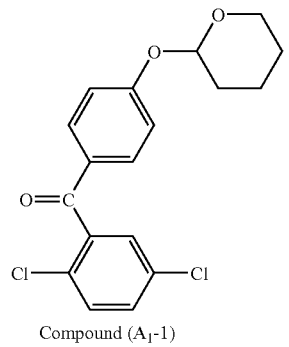

Compound (A₁-1)

+

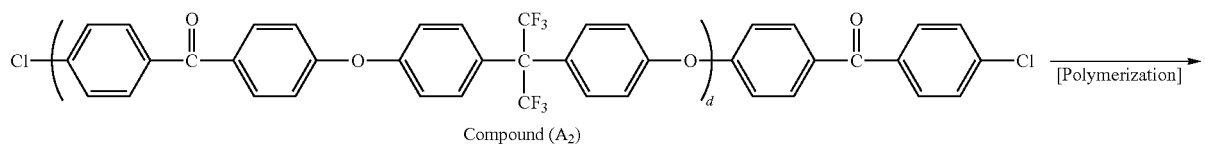

Compound (A₂)

[Polymerization]

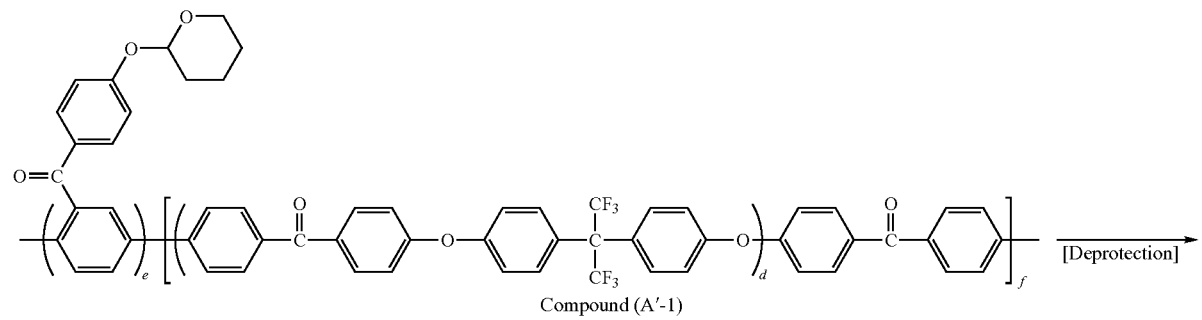

Compound (A'-1)

[Deprotection]

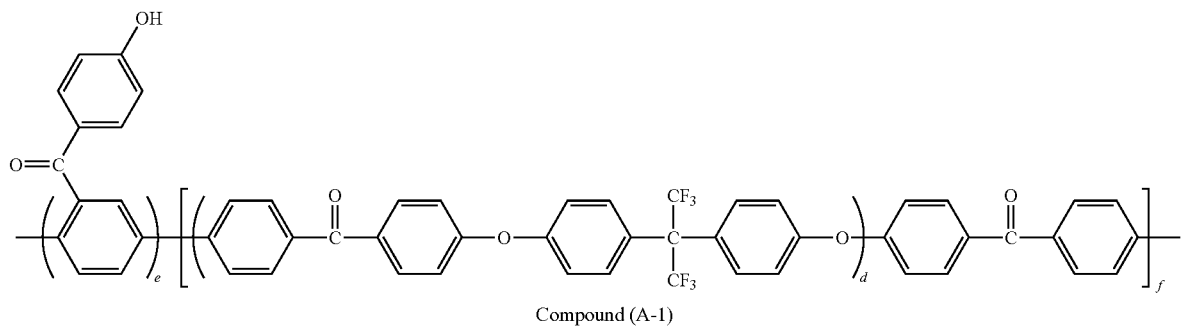

Compound (A-1)

Figure 5:
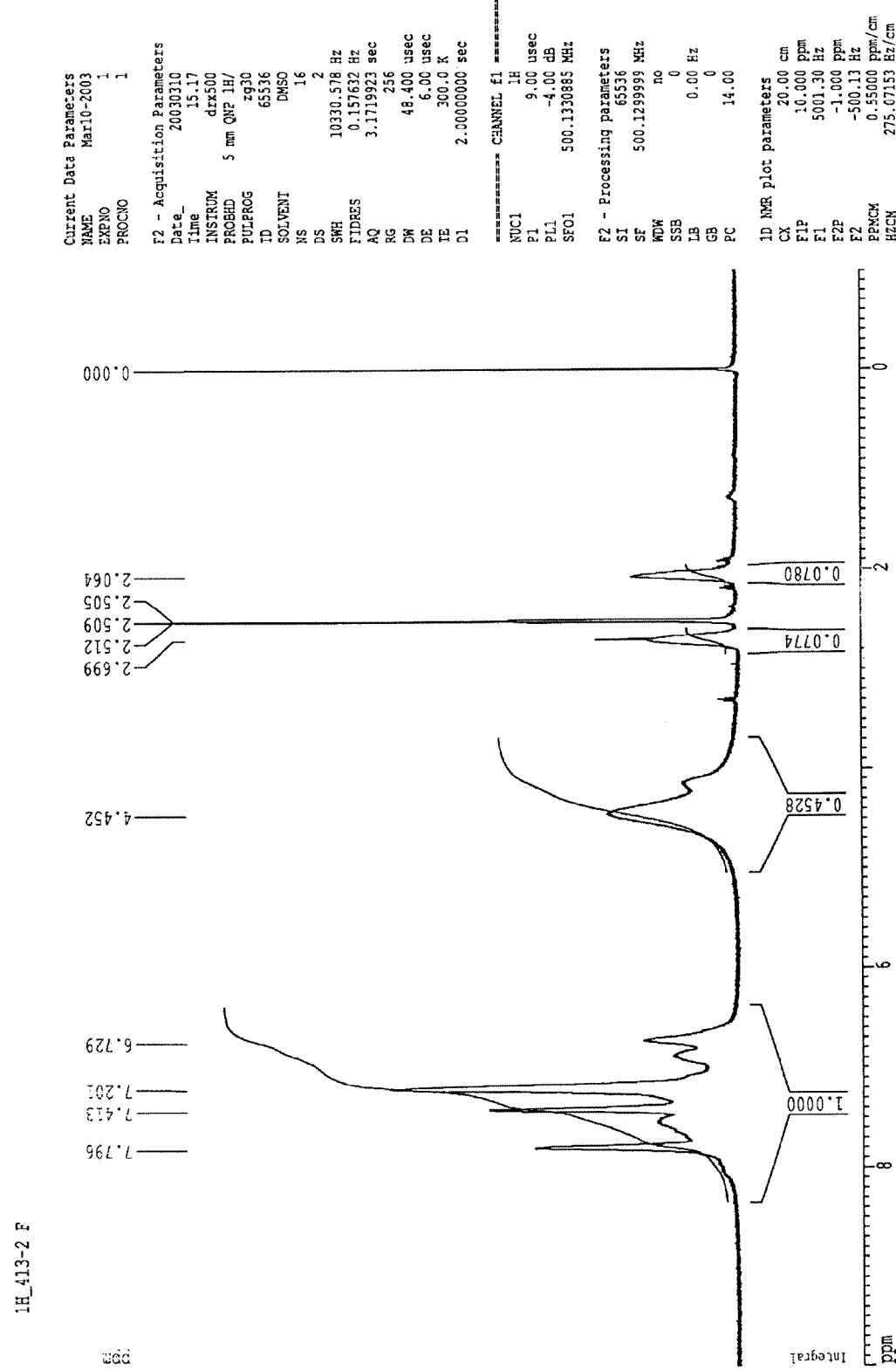
FIG. 5 is a $^1$H-NMR spectrum of a Compound (1) obtained in Example 1.

(III) Synthesis of Polyarylene (1) having Sulfonic Acid Group 15.2 g of Compound (A-1) was added to and dissolved in 250 ml of N,N-dimethylacetamide (DMAc) by heating the mixture at 100° C. while stirring. Next, 1.06 g (133 mmol) of lithium hydride was added and the mixture was stirred for 2 hours. Then, 16.2 g (133 mmol) of propanesultone (B-1) was added and the mixture was reacted for 8 hours. The insoluble components in the reaction mixture were collected by filtration and added to 1 N hydrochloric acid to cause the polymer to precipitate. The precipitated polymer was washed with 1 N hydrochloric acid and washed with distilled water until the pH became neutral. The polymer was dried at 75° C. to obtain 19.2 g of a powder of polyarylene (Compound (1)) having a sulfonic acid group. The $^1$H-NMR spectrum of Compound (1) is shown in FIG. 5. The process (III) in Example 1 is shown in the following formula (17), wherein d, e, and f are positive integers.

(17)
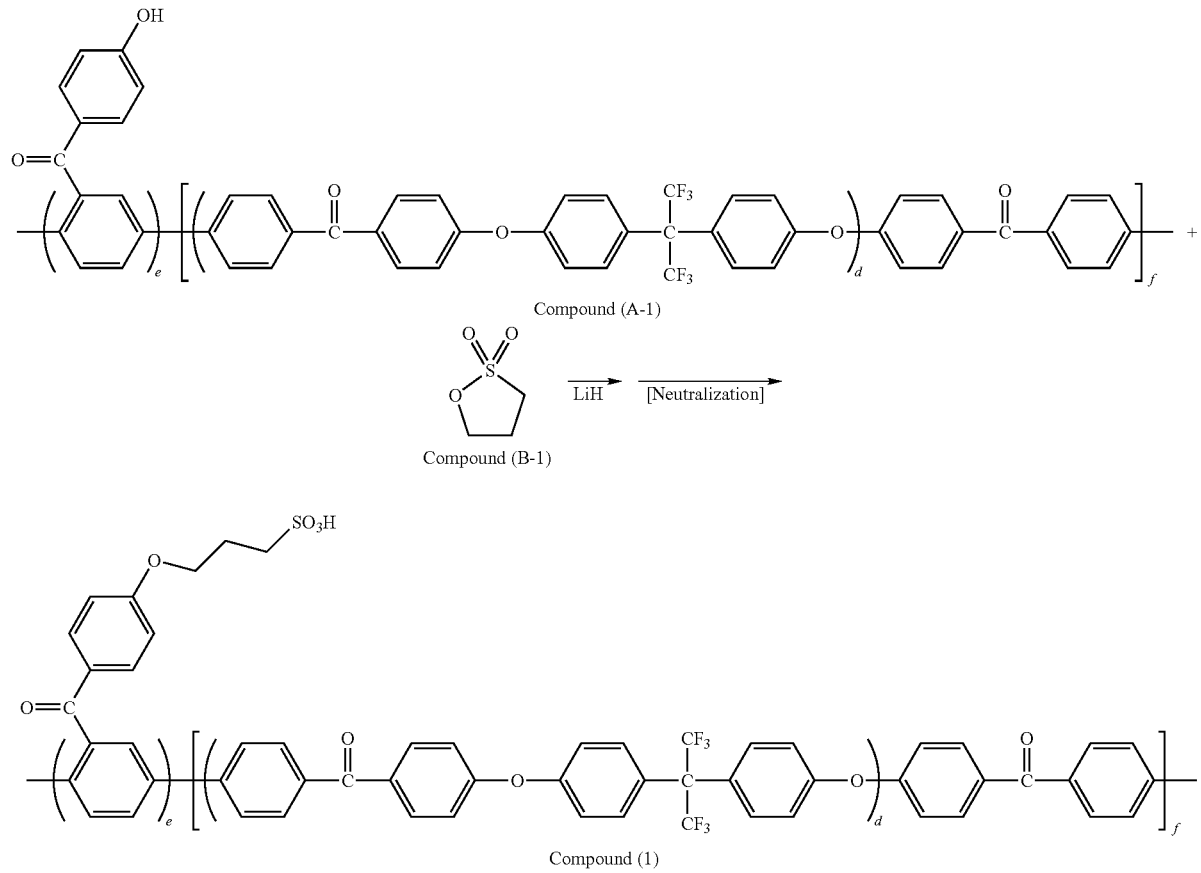
4.3. Example 2
A reaction was carried out in the same manner as in Example 1, except for using 18.1 g (133 mmol) of butanesultone (B-2) instead of 16.2 g (133 mmol) of propanesultone (B-1) to obtain 20.8 g of a powder of polyarylene (Compound (2)) having a sulfonic acid group. The process (III) in Example 2 is shown in the following formula (18), wherein d, e, and f are positive integers.
(18)
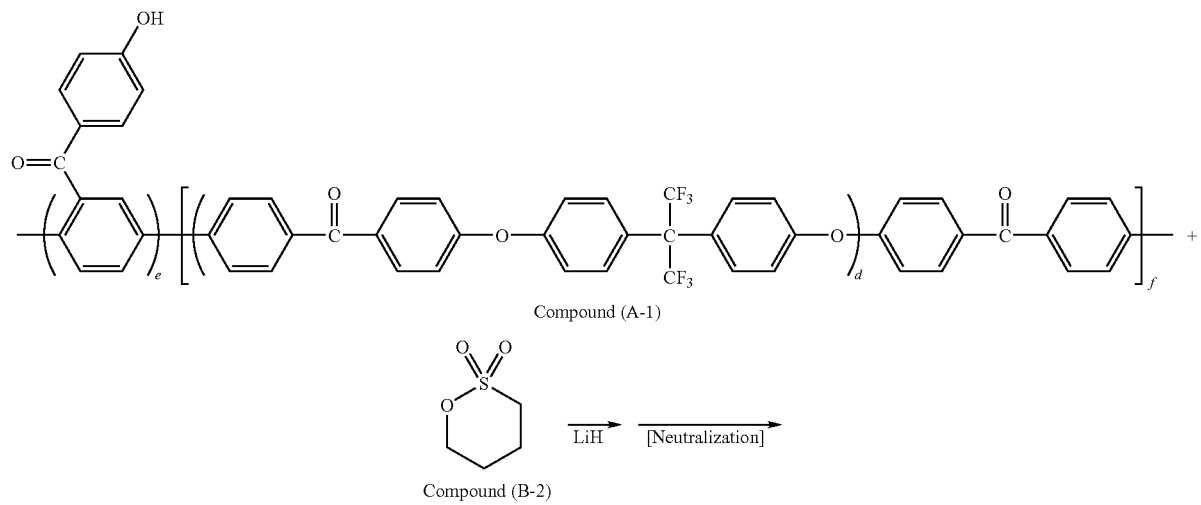

-continued

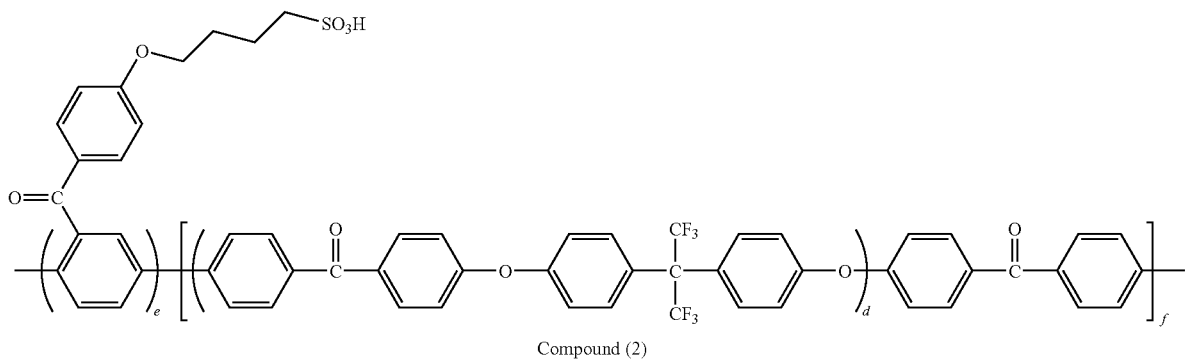

Compound (2)

4.4. Example 3

(I) Synthesis of Benzophenone Derivative (Compound ($A_1'$-2))

(i) Synthesis of 2,5-dichloro-2',4'-dihydroxybenzophenone

A 2-liter three-neck flask equipped with a stirrer, a nitrogen-introducing pipe, and a dropping funnel was charged with 33.2 g (240 mmol) of 1,3-dimethoxybenzene and 300 ml of dichloromethane. After cooling in an ice water bath, 32 g (240 mmol) of aluminum chloride was added. Next, 50.3 g (240 mmol) of 2,5-dichlorobenzoic acid chloride was slowly added dropwise from the dropping funnel. After adding dropwise, 32 g (240 mmol) of aluminum chloride was added. The mixture was warmed to room temperature and stirred for 12 hours.

The reaction mixture was added to 1 l of ice cooled water containing 150 ml of concentrated hydrochloric acid, and the separated organic layer was extracted with a 10% sodium hydroxide aqueous solution. On the other hand, the aqueous layer was neutralized with hydrochloric acid and the deposited solid was extracted with 1 l of ethyl acetate. The solvent was evaporated and the resulting solid was recrystallized from ethyl acetate to obtain 57 g (yield: 76%) of 2,5-dichloro-2',4'-dihydroxybenzophenone (Compound ($A_1'$-2)).

(ii) Synthesis of 2,5-dichloro-2',4'-di(tetrahydro-2-pyranyloxy)benzophenone (Compound ($A_1$-2))

A flask was charged with 28.3 g (100 mmol) of 2,5-dichloro-2',4'-dihydroxybenzophenone (Compound ($A_1'$-2)), 200 g (2,400 mmol) of 2H-dihydropyrane, and 100 ml of toluene. 3.0 g of a cation exchange resin (Amberlist 15) was added to the mixture while stirring. After continuing stirring for 5 hours at room temperature, the cation exchange resin was removed. The filtrate was washed with an aqueous solution of sodium hydroxide and a brine, dried over magnesium sulfate, and the solvent was evaporated. The resulting solid was recrystallized from toluene to obtain 21.2 g (yield: 47%) of 2,5-dichloro-2',4'-di(tetrahydro-2-pyranyloxy)benzophenone (Compound ($A_1$-2)). The process steps (i) and (ii) in Example 3 are shown in the following formula (19).

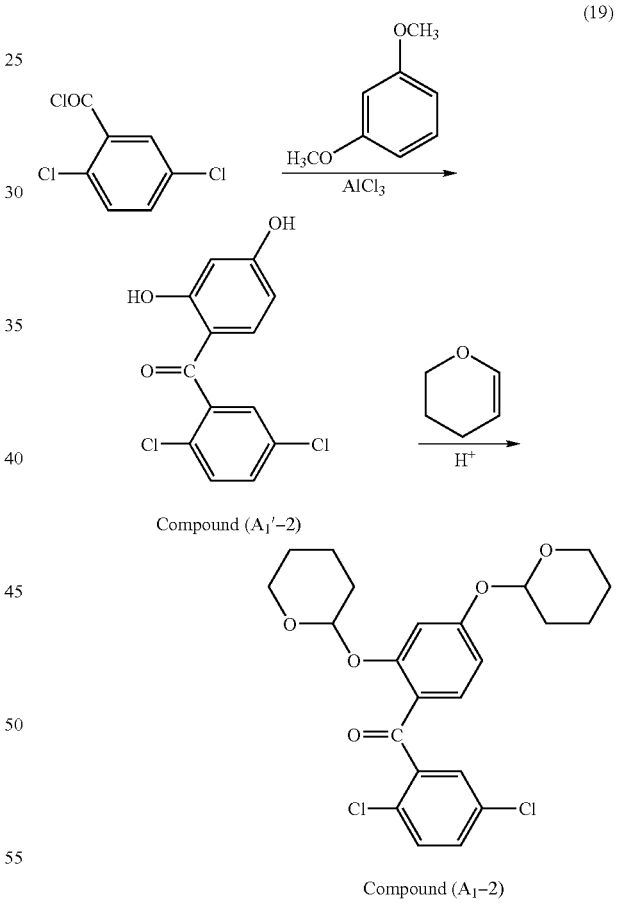

(19)

(II) Synthesis of Polyarylene (Compound (A-2))

A 500 ml flask equipped with stirring blades, a thermometer, and a nitrogen-introducing pipe was charged with 19.45 g (43.1 mmol) of 2,5-dichloro-2',4'-di(tetrahydro-2-pyranyloxy)benzophenone (Compound ($A_1$-2)), 20.12 g (1.80 mmol) of a polycondensate of 4,4'-dichlorobenzophenone-2,2-bis(4-hydroxyphenyl)-1,1,1,3,3,3-hexafluoropropane (number average molecular weight: 11,200); 0.883 g (1.35 mmol) of bis(triphenylphosphine) nickel dichloride; 0.877 g (5.85 mmol) of sodium iodide; 4.72 g (18 mmol) of triphenylphosphine, and 7.06 g (108 mmol) of zinc. The mixture was dried under vacuum. After replacing the inside of the flask with dry nitrogen, 87 ml of N,N-dimethylacetamide (DMAc) was added to initiate polymerization. The temperature of the reaction solution was controlled in the range of 70 to 90° C. during polymerization. After three hours, the reaction mixture was diluted with the addition of 200 ml of DMAc, and the insoluble components were removed by filtration to obtain a filtrate of the polymer solution. The filtrate of the polymer solution contained Compound (A'-2), and it is presumed that Compound (A'-2) has a tetrahydro-2-pyranyl group. The filtrate of the polymer solution was added to 1.5 l of methanol containing 10 vol % of concentrated hydrochloric acid to precipitate a polymer. After collecting the precipitate by filtration, the resulting solid was dried to obtain 28.5 g of a polymer having a hydroxyl group (Compound (A-2)). The process (II) in Example 3 is shown in the following formula (20), wherein d, e, and f are positive integers.

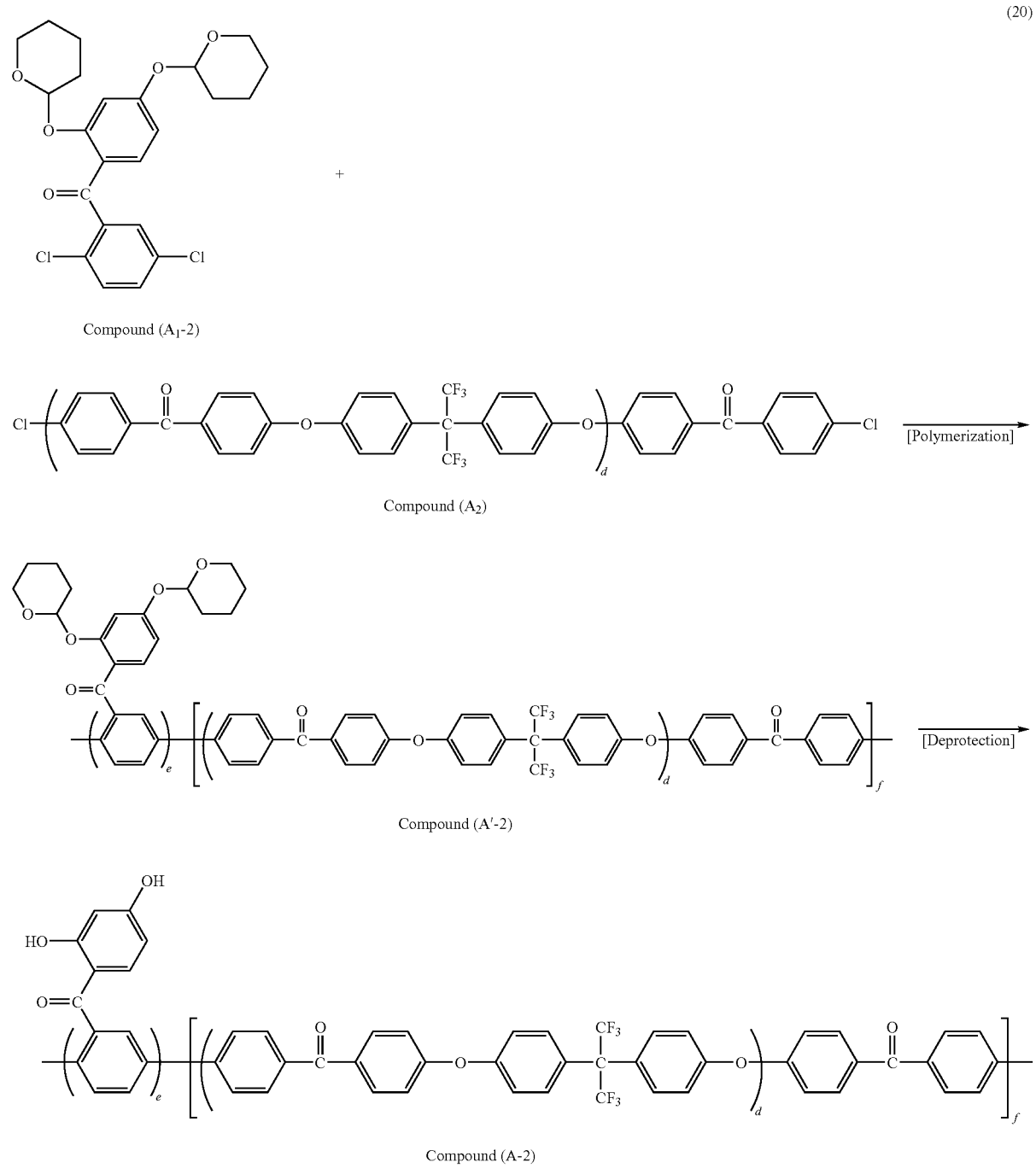

(III) Synthesis of Polyarylene (3) having Sulfonic Acid Group 29.1 g of the Compound (A-2) was added to and dissolved in 500 ml of N,N-dimethylacetamide (DMAc) by heating the mixture at 100° C. while stirring. Next, 2.06 g (258 mmol) of lithium hydride was added and the mixture was stirred for 2 hours. Then, 31.6 g (258 mmol) of propanesultone (B-1) was added and the mixture was stirred for 8 hours. The insoluble components in the reaction mixture were collected by filtration and added to 1 N hydrochloric acid to cause the polymer to precipitate. The precipitated polymer was washed with 1 N hydrochloric acid and washed with distilled water until the pH became neutral. The polymer was dried at 75° C. to obtain 38.2 g of a powder of polyarylene (Compound (3)) having a sulfonic acid group. The process (III) in Example 3 is shown in the following formula (21), wherein d, e, and f are positive integers.

4.5. Example 4

(I) Synthesis of Benzophenone Derivative (Compound (A₁'-3))

(i) Synthesis of 2,5-dichloro-4'-hydrothiobenzophenone

A 2-liter three-neck flask equipped with a stirrer, a nitrogen-introducing pipe, and a dropping funnel was charged with 74.5 g (600 mmol) of methylthiobenzene and 480 ml of dichloromethane. After cooling in an ice water bath, 80 g (600 mmol) of aluminum chloride was added. Next, 125.7 g (600 mmol) of 2,5-dichlorobenzoic acid chloride was slowly added dropwise from the dropping funnel. After adding dropwise, 80 g (600 mmol) of aluminum chloride was added. The mixture was warmed to room temperature and stirred for 12 hours.

The reaction mixture was added to 2 l of ice cooled water containing 300 ml of concentrated hydrochloric acid, and the separated organic layer was extracted with a 10% sodium (21)

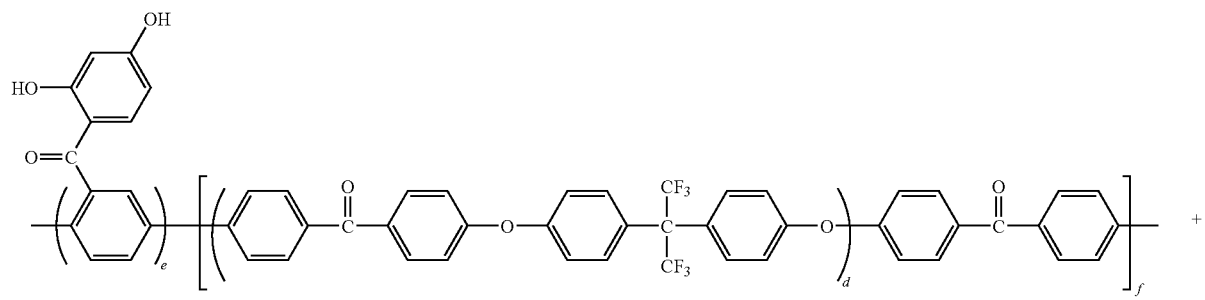

Compound (A-2)

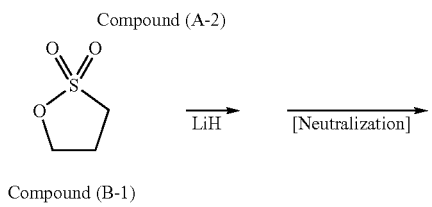

Compound (B-1)

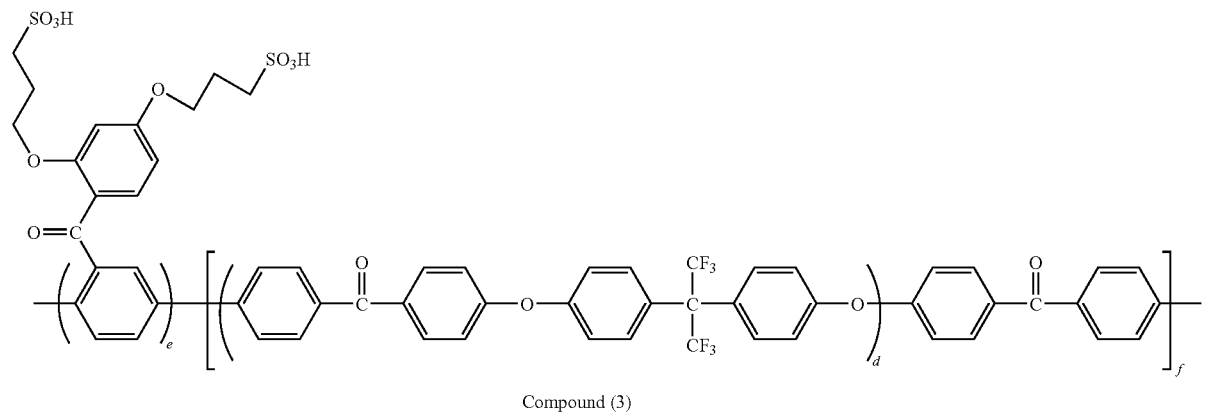

Compound (3)

hydroxide aqueous solution. On the other hand, the aqueous layer was neutralized with hydrochloric acid and the deposited solid was extracted with 2 l of ethyl acetate. The solvent was evaporated, and the resulting solid was recrystallized from n-hexane to obtain 150 g (yield: 88%) of 2,5-dichloro-4'-hydrothiobenzophenone (Compound ($A_1'$-3)).

(ii) Synthesis of 2,5-dichloro-4'-(tetrahydro-2-pyranylthio) benzophenone (Compound ($A_1$-3))

A flask was charged with 28.3 g (100 mmol) of 2,5-dichloro-4'-hydrothiobenzophenone (Compound ($A_1'$-3)), 100 g (1,200 mmol) of 2H-dihydropyrane, and 100 ml of toluene. 1.5 g of a cation exchange resin (Amberlist 15) was added to the mixture while stirring. After continuing stirring for 5 hours at room temperature, the cation exchange resin was removed by filteration. The filtrate was washed with an aqueous solution of sodium hydroxide and a brine, dried over magnesium sulfate, and the solvent was evaporated. The resulting solid was recrystallized from toluene to obtain 19.5 g (yield: 53%) of 2,5-dichloro-4'-(tetrahydro-2-pyranylthio) benzophenone (Compound ($A_1$-3)). The processes (i) and (ii) in Example 4 are shown in the following formula (22).

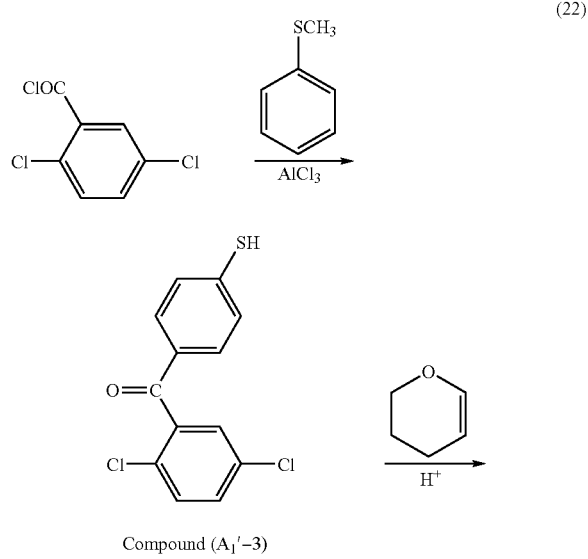

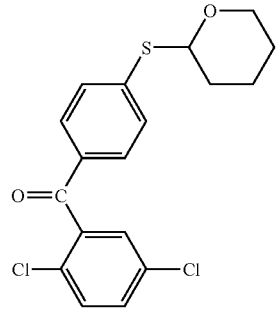

Compound ($A_1$-3)

(II) Synthesis of Polyarylene (Compound (A-3))

A 500 ml flask equipped with stirring blades, a thermometer, and a nitrogen-introducing pipe was charged with 16.3 g (44.4 mmol) of 2,5-dichloro-4'-(tetrahydro-2-pyranylthio) benzophenone (Compound ($A_1$-3)), 6.55 g (0.585 mmol) of polycondensate of 4,4'-dichlorobenzophenone-2,2-bis(4-hydroxyphenyl)-1,1,1,3,3,3-hexafluoropropane (number average molecular weight: 11,200); 0.883 g (1.35 mmol) of bis (triphenylphosphine) nickel dichloride, 0.877 g (5.85 mmol) of sodium iodide, 4.72 g (18 mmol) of triphenylphosphine, and 7.06 g (108 mmol) of zinc. The mixture was dried under vacuum. After replacing the inside of the flask with dry nitrogen, 52 ml of N,N-dimethylacetamide (DMAc) was added to initiate polymerization. The temperature of the reaction solution was controlled in the range of 70 to 90° C. during polymerization. After three hours, the reaction mixture was diluted with the addition of 200 ml of DMAc, and the insoluble components were removed by filtration to obtain a filtrate of the polymer solution. The filtrate of the polymer solution contained Compound (A'-3) and it is presumed that Compound (A'-3) has a tetrahydro-2-pyranyl group. The filtrate of the polymer solution was added to 1.5 l of methanol containing 10 vol % of concentrated hydrochloric acid to precipitate a polymer. After collecting the precipitate by filtration, the resulting solid was dried to obtain 15.2 g of a polymer having a thiol group (Compound (A-3)). The process (II) in Example 4 is shown in the following formula (23), wherein d, e, and f are positive integers.

(23)

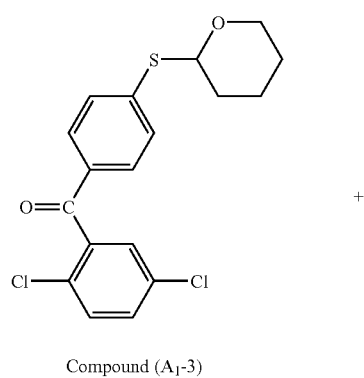

Compound ($A_1$-3)

+

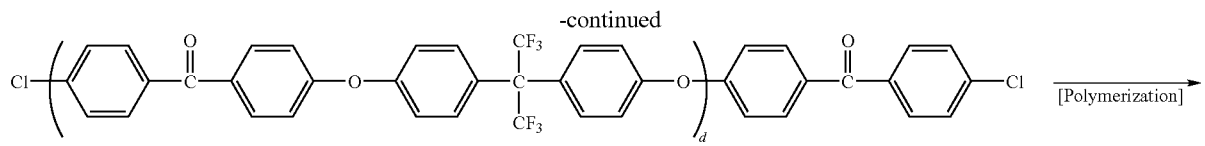

Compound (A₂)

[Polymerization] →

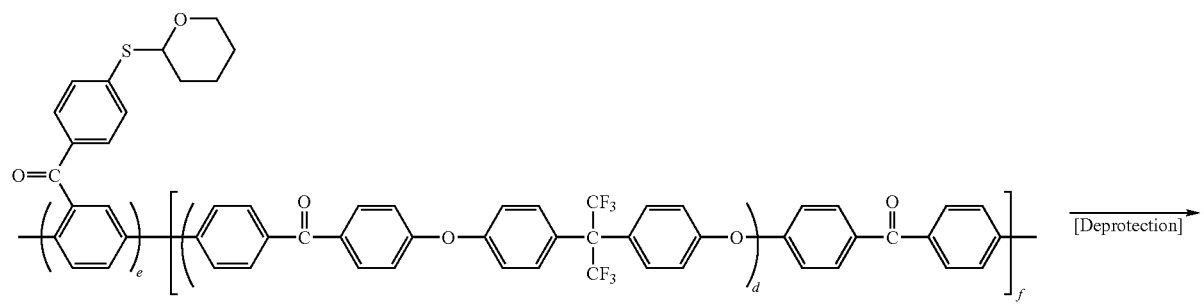

Compound (A'-3)

[Deprotection] →

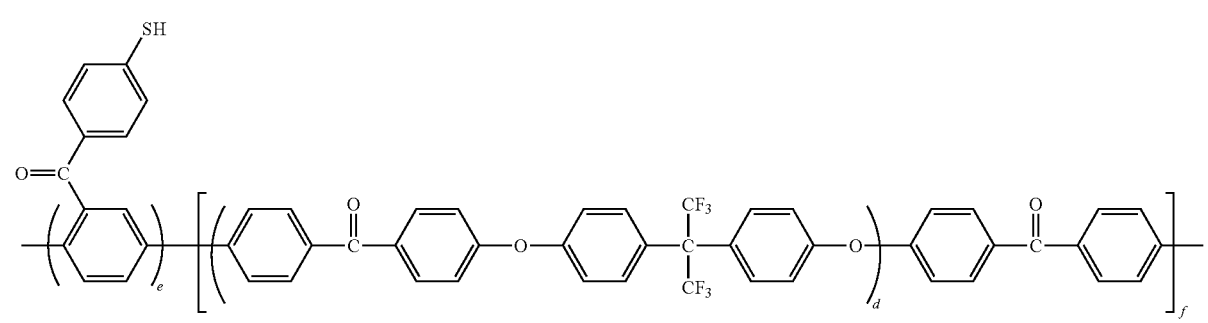

Compound (A-3)

(III) Synthesis of Polyarylene (4) having Sulfonic Acid Group 15.2 g of the Compound (A-3) was added to and dissolved in 250 ml of N,N-dimethylacetamide (DMAc) by heating the mixture at 100° C. while stirring. Next, 1.06 g (133 mmol) of lithium hydride was added and the mixture was stirred for 2 hours. Then, 16.2 g (133 mmol) of propanesultone (B-1) was added and the mixture was stirred for 8 hours. The insoluble components in the reaction mixture were collected by filtration and added to 1 N hydrochloric acid to cause the polymer to precipitate. The precipitated polymer was washed with 1 N hydrochloric acid and washed with distilled water until the pH became neutral. The polymer was dried at 75° C. to obtain 19.9 g of a powder of polyarylene (Compound (4)) having a sulfonic acid group. The process (III) in Example 4 is shown in the following formula (24), wherein d, e, and f are positive integers.

(24)

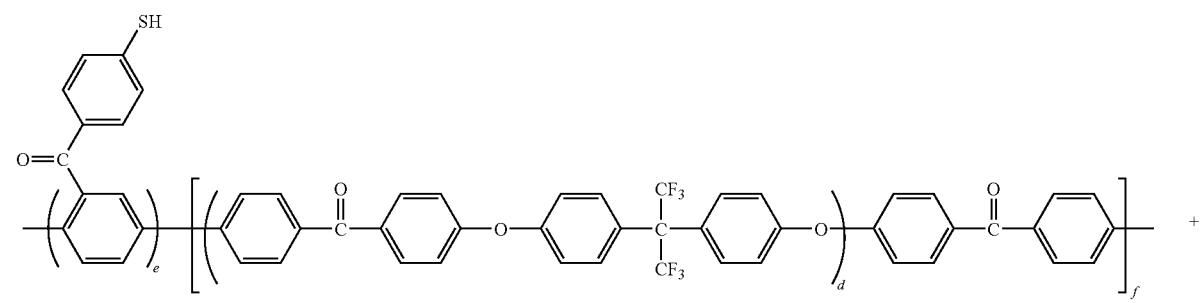

Compound (A-3)

+

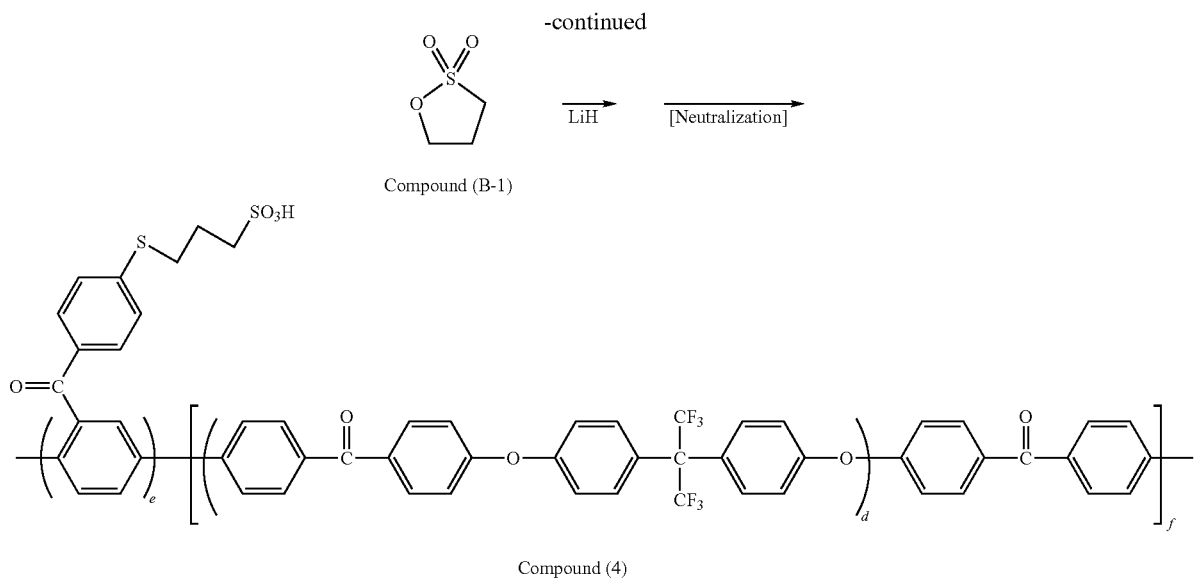

Compound (B-1)

Compound (4)

The properties of the polyarylenes obtained in Examples 1 to 4 are shown in Table 1.

TABLE 1

| Evaluation item | Unit | Example 1 | Example 2 | Example 3 | Example 4 |
|---|---|---|---|---|---|
| Equivalent of sulfonic acid group | meq/g | 1.9 | 2.0 | 2.0 | 1.9 |
| Proton conductivity | S/cm | 0.27 | 0.25 | 0.28 | 0.22 |
| Hot water resistance | weight retention % | 100 | 100 | 100 | 100 |
| Thermal decomposition initiation temperature | °C. | 200 | 200 | 200 | 240 |
| Fenton's reagent resistance | weight retention % | 100 | 100 | 100 | 100 |

The invention claimed is:

1. A polyarylene comprising a structural unit according to formula (1):

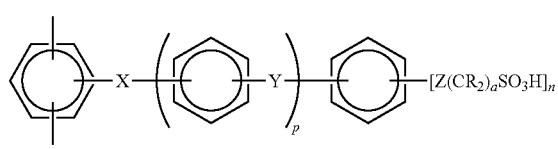

(1)

wherein:

X and Y each independently represents a group selected from the group consisting of —CO—, —CONH—, —(CF$_2$)$_q$— in which q is an integer of 1 to 10, —C(CF$_3$)$_2$—, —COO—, —SO—, —SO$_2$—, —O—, —S—, —CH=CH—, —C≡C—, and groups according to the following formulas

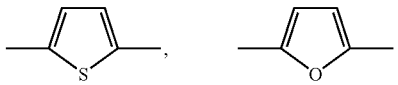

or a single bond;

Z represents an oxygen atom or a sulfur atom;

R represents at least one atom or group selected from the group consisting of a hydrogen atom, a fluorine atom, an alkyl group, and a fluorine-substituted alkyl group;

a is an integer of 1 to 20;

n is an integer of 1 to 5;

p is an integer of 0 to 10; and the polyarylene has a molecular weight of from 10,000 to 1,000,000 in terms of polystyrene-reduced weight average molecular weight determined by gel permeation chromatography.

2. The polyarylene according to claim 1, comprising:

0.5 to 100 mol % of the structural unit according to formula (1); and optionally further comprising 0 to 99.5 mol % of a structural unit according to formula (2):

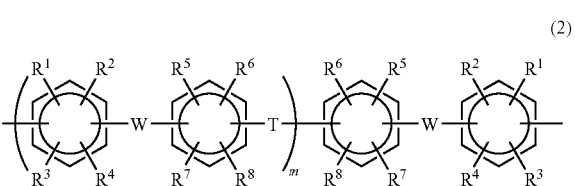

(2)

wherein:

R$^1$ to R$^8$ each independently represent at least one atom or group selected from the group consisting of a hydrogen atom, a fluorine atom, an alkyl group, a fluorine-substituted alkyl group, an allyl group, and an aryl group;

W represents a group selected from the group consisting of —CO—, —CONH—, —(CF$_2$)$_q$— in which q is an integer of 1 to 10, —C(CF$_3$)$_2$—, —COO—, —SO—, and —SO$_2$—;

T represents a group selected from the group consisting of —CO—, —CONH—, —(CF$_2$)$_q$— in which q is an integer of 1 to 10, —C(CF$_3$)$_2$—, —COO—, —SO—, —SO$_2$—, —O—, —S—, —CH=CH—, —C≡C—, and groups according to the following formulas

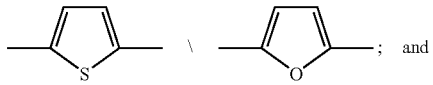; and m is 0 or a positive integer.

3. A process for producing the polyarylene of claim 1, comprising:

reacting Compound (A) comprising a structural unit according to formula (3) with Compound (B) according to formula (4) and/or Compound (C) according to formula (5):

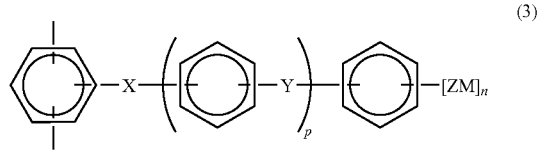 (3)

wherein:
X and Y each independently represent a group selected from the group consisting of —CO—, —CONH—, —(CF$_2$)$_q$— in which q is an integer of 1 to 10, —C(CF$_3$)$_2$—, —COO—, —SO—, —SO$_2$—, —O—, —S—, —CH=CH—, —C≡C—, and groups according to the following formulas

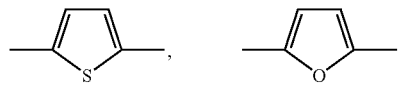, or a single bond;
Z represents an oxygen atom or a sulfur atom;
n is an integer of 1 to 5;
p is an integer of 0 to 10; and
M represents a hydrogen atom or an alkali metal atom,

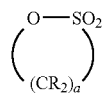 (4)

wherein:
R represents at least one atom or group selected from the group consisting of a hydrogen atom, a fluorine atom, an alkyl group, and a fluorine-substituted alkyl group; and
a is an integer of 1 to 20, L(CR$_2$)$_a$—SO$_3$M (5)

wherein:
R represents at least one atom or group selected from the group consisting of a hydrogen atom, a fluorine atom, an alkyl group, and a fluorine-substituted alkyl group;
a is an integer of 1 to 20;
M represents a hydrogen atom or an alkali metal atom; and
L represents a chlorine atom, a bromine atom, or an iodine atom.

4. The process according to claim 3, wherein the Compound (A) further comprises a structural unit according to formula (2):

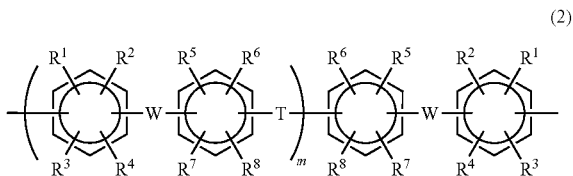 (2)

wherein:
R$^1$ to R$^8$ each independently represent at least one atom or group selected from the group consisting of a hydrogen atom, a fluorine atom, an alkyl group, a fluorine-substituted alkyl group, an allyl group, and an aryl group;

W represents a group selected from the group consisting of —CO—, —CONH—, —(CF$_2$)$_q$— in which q is an integer of 1 to 10, —C(CF$_3$)$_2$—, —COO—, —SO—, and —SO$_2$—;

T represents a group selected from the group consisting of —CO—, —CONH—, —(CF$_2$)$_q$— in which q is an integer of 1 to 10, —C(CF$_3$)$_2$—, —COO—, —SO—, —SO$_2$—, —O—, —S—, —CH=CH—, —C≡C—, and groups according to the following formulas

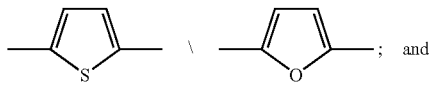; and m is 0 or a positive integer.

5. A solid polyelectrolyte comprising the polyarylene according to claim 1.

6. A proton conductive film comprising the polyarylene according to claim 1.

7. A solid polyelectrolyte comprising the polyarylene according to claim 2.

8. A proton conductive film comprising the polyarylene according to claim 2.

9. The polyarylene according to claim 1, wherein:
X and Y each independently represents a group selected from the group consisting of —CO—, —CONH—, —(CF$_2$)$_q$— in which q is an integer of 1 to 10, —C(CF$_3$)$_2$—, —COO—, —SO—, —SO$_2$—, —O—, —S—, —C≡C—, and groups according to the following formulas

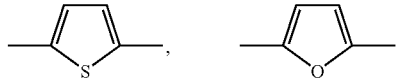, or a single bond.

10. The process according to claim 3, wherein:
X and Y each independently represents a group selected from the group consisting of —CO—, —CONH—, —(CF$_2$)$_q$— in which q is an integer of 1 to 10, —C(CF$_3$)$_2$—, —COO—, —SO—, —SO$_2$—, —O—, —S—, —C≡C—, and groups according to the following formulas

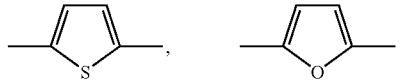, or a single bond.

* * * * *